US012445588B2

(12) United States Patent
Basu et al.

(10) Patent No.: US 12,445,588 B2
(45) Date of Patent: Oct. 14, 2025

(54) ADAPTIVE DISPLAYS TO ADDRESS THE VERGENCE-ACCOMMODATION CONFLICT

(71) Applicant: Adeia Guides Inc., San Jose, CA (US)

(72) Inventors: Anup Basu, Saint Albert (CA);
Dhananjay Lal, Englewood, CO (US);
Ning Xu, Irvine, CA (US)

(73) Assignee: Adeia Guides Inc., San Jose, CA (US)

( * ) Notice: Subject to any disclaimer, the term of this patent is extended or adjusted under 35 U.S.C. 154(b) by 143 days.

(21) Appl. No.: 18/204,599

(22) Filed: Jun. 1, 2023

(65) Prior Publication Data

US 2024/0406367 A1 Dec. 5, 2024

(51) Int. Cl.
*H04N 13/296* (2018.01)
*H04N 13/128* (2018.01)
*H04N 13/344* (2018.01)
*H04N 13/365* (2018.01)

(52) U.S. Cl.
CPC ......... *H04N 13/296* (2018.05); *H04N 13/128* (2018.05); *H04N 13/344* (2018.05); *H04N 13/365* (2018.05)

(58) Field of Classification Search
CPC .. H04N 13/128; H04N 13/296; H04N 13/344; H04N 13/365; H04N 13/393
See application file for complete search history.

(56) References Cited

U.S. PATENT DOCUMENTS

| | | | | |
|---|---|---|---|---|
| 9,268,139 B2* | 2/2016 | Magyari | ............... | G02B 7/04 |
| 11,961,431 B2* | 4/2024 | Wetzstein | ............... | G09G 3/20 |
| 2001/0005285 A1* | 6/2001 | Tanaka | ............... | G02B 27/017 |
| | | | | 359/630 |
| 2007/0242237 A1* | 10/2007 | Thomas | ............... | G03B 35/24 |
| | | | | 353/94 |
| 2008/0024391 A1* | 1/2008 | Oliver | ............... | G09G 3/001 |
| | | | | 345/8 |
| 2008/0204548 A1* | 8/2008 | Goulanian | ............... | G09G 3/22 |
| | | | | 348/51 |

(Continued)

OTHER PUBLICATIONS

"Flexible display," Wikipedia, Retrieved from https://en.wikipedia.org/wiki/Flexible_display., Retrieved on Mar. 21, 2025, 1 page.

(Continued)

*Primary Examiner* — Peter D Le
(74) *Attorney, Agent, or Firm* — HALEY GUILIANO LLP

(57) ABSTRACT

Systems and methods are provided herein for manipulating a stereoscopic display so that portions of the stereoscopic display are located at varying planes. This may be accomplished by a device comprising a plurality of microdisplays receiving a piece of three-dimensional (3D) content. The device may determine that a portion of the 3D content comprises a 3D object at a location within the 3D content. The device may then change the position of a first microdisplay according to the location of the 3D object within the 3D content. The device may display the 3D content using the plurality of microdisplays, wherein the first microdisplay displays the 3D object. The first microdisplay changing positions according to the location of the 3D object within the 3D content provides depth for rendering the 3D object at a suitable accommodation distance and reduces or eliminates the vergence-accommodation conflict for the user.

20 Claims, 16 Drawing Sheets

(56) References Cited

U.S. PATENT DOCUMENTS

| | | | | |
|---|---|---|---|---|
| 2009/0005961 | A1* | 1/2009 | Grabowski | G02B 27/01 |
| | | | | 701/532 |
| 2009/0156128 | A1* | 6/2009 | Franson | H04N 21/4126 |
| | | | | 455/66.1 |
| 2010/0060551 | A1* | 3/2010 | Sugiyama | G02B 26/06 |
| | | | | 353/31 |
| 2010/0214537 | A1* | 8/2010 | Thomas | H04N 13/351 |
| | | | | 353/7 |
| 2012/0113092 | A1* | 5/2012 | Bar-Zeev | G06T 19/006 |
| | | | | 345/419 |
| 2013/0002813 | A1* | 1/2013 | Vaught | H04N 13/344 |
| | | | | 348/43 |
| 2014/0340389 | A1* | 11/2014 | Lanman | G02B 27/017 |
| | | | | 345/589 |
| 2015/0277129 | A1* | 10/2015 | Hua | G02B 27/106 |
| | | | | 359/462 |
| 2015/0301360 | A1* | 10/2015 | Chow | G02C 11/10 |
| | | | | 351/158 |
| 2016/0003636 | A1* | 1/2016 | Ng-Thow-Hing | G01C 21/365 |
| | | | | 701/418 |
| 2017/0078652 | A1* | 3/2017 | Hua | G06V 20/20 |
| 2018/0211448 | A1* | 7/2018 | Bar-Zeev | G09G 3/001 |
| 2018/0249086 | A1* | 8/2018 | Ozawa | G05D 1/0038 |
| 2018/0321496 | A1* | 11/2018 | Bohn | G09G 3/003 |
| 2019/0179409 | A1* | 6/2019 | Jones | G02B 27/0172 |
| 2020/0278544 | A1* | 9/2020 | Poulad | G02B 27/0179 |
| 2021/0014473 | A1* | 1/2021 | Hua | G02B 27/0172 |
| 2021/0127046 | A1* | 4/2021 | Kamm | G01J 3/0248 |
| 2021/0133994 | A1* | 5/2021 | Valli | G02B 27/017 |
| 2021/0165222 | A1* | 6/2021 | Jarvenpaa | H04N 13/344 |
| 2021/0181533 | A1* | 6/2021 | Kim | G02B 27/0176 |
| 2021/0255462 | A1* | 8/2021 | Cooper | G06F 3/011 |
| 2022/0003990 | A1* | 1/2022 | Yonezawa | G02B 27/0172 |
| 2022/0075199 | A1* | 3/2022 | Trisnadi | G09G 3/32 |
| 2024/0013752 | A1* | 1/2024 | Hua | G09G 5/391 |

OTHER PUBLICATIONS

"Luminous Fabric, Glowing Fiber Optic Fabric, LED light up Cloth, Color Changeable Material," Retrieved from https://www.etsy.com/ca/listing/1283669248/luminous-fabric-glowing-fiber-optic, Dec. 2022.

Akeley K. et al., "A stereo display prototype with multiple focal distances," ACM transactions on graphics (TOG), vol. 23, Issue 3, 2004, pp. 804-813.

Antipa. N. et al., "Single-shot diffuser-encoded light field imaging," 2016 IEEE International Conference on Computational Photography (ICCP). IEEE, 2016, 11 pages.

Banks. MS. et al., "Consequences of incorrect focus cues in stereo displays," Journal of the Society for Information Display, vol. 24, Issue 7, 2008, 11 pages.

Gosline. AH. et al., "Percutaneous intracardiac beating-heart surgery using metal MEMS tissue approximation tools," The International journal of robotics research, vol. 31, Issue 9, 2012, pp. 1081-1093.

Huang. FC. et al., "The light field stereoscope," SIGGRAPH emerging technologies, 2015, 12 pages.

Jiang. F. et al., "A flexible MEMS technology and its first application to shear stress sensor skin," Proceedings IEEE The Tenth Annual International Workshop on Micro Electro Mechanical Systems. An Investigation of Micro Structures, Sensors, Actuators, Machines and Robots. IEEE, 1997, 6 pages.

Kamal. MH. et al., "Tensor low-rank and sparse light field photography," Computer Vision and Image Understanding, vol. 145, 2016, pp. 172-181.

Kraminda. G., "Resolving the vergence-accommodation conflict in head-mounted displays," IEEE transactions on visualization and computer graphics, vol. 22, Issue 7, 2015, pp. 1912-1931.

Lanman. D. et al., "Near-eye light field displays," ACM transactions on graphics (TOG), vol. 32, Issue 6, 2013, pp. 1-10.

Levoy, M., et al., "Light field rendering," SIGGRAPH96, Proceedings of the 23rd annual conference on Conputer Graphics Proceeding, 1996, pp. 31-42.

Li. B. et al., "A New MEMS Engine for Large-volume Subcutaneous Injectors," Stroke, 2022, 6 pages.

Love. GD. et al., "High-speed switchable lens enables the development of a volumetric stereoscopic display," Optics express, vol. 17, Issue 18, 2009, pp. 15716-15725.

Marinan. A. et al., "Payload characterization for CubeSat demonstration of MEMS deformable mirrors," Adaptive Optics Systems IV., vol. 9148, 2014, 17 pages.

Marwah. K. et al., "Compressive light field photography using overcomplete dictionaries and optimized projections," ACM Transactions on Graphics (TOG), vol. 32, Issue 4, 2013, pp. 1-12.

Padmanaban. N. et al., "Optimizing virtual reality for all users through gaze-contingent and adaptive focus displays," Proceedings of the National Academy of Sciences, vol. 114, Issue 9, 2017, pp. 2183-2188.

Rolland. JP. et al., "Multifocal planes head-mounted displays," Applied optics, vol. 39, Issue 19, 2000, pp. 3209-3215.

Severson. SA. et al., "KAPAO: a MEMS-based natural guide star adaptive optics system," MEMS Adaptive Optics VII., vol. 8617, 2013, 10 pages.

Shibata. T. et al., "The zone of comfort: Predicting visual discomfort with stereo displays," Journal of vision, vol. 11, Issue 8, 2011, 29 pages.

Teague. MR., "Deterministic phase retrieval: a Green's function solution," Journal of the Optical Society of America, vol. 73, Issue 11, 1983, pp. 1434-1441.

Veeraraghavan, A. et al., "Dappled photography: Mask enhanced cameras for heterodyned light fields and coded aperture refocusing," ACM Trans. Graph., vol. 26, Issue 3, 2007, 14 pages.

Wei. LY. et al., "Improving light field camera sample design with irregularity and aberration," ACM Transactions on Graphics (TOG), vol. 34, Issue 4, 2015, pp. 1-11.

Xianfeng. X. et al., "Design and realization of control system of a novel digital hydraulic 2-DoF motion platform," 1st International Conference on Mechanical Engineering and Material Science (MEMS 2012). Atlantis Press, 2012, 4 pages.

Yamamoto. T. et al., "LIFLET: Light field live with thousands of lenslets," ACM SIGGRAPH 2004 Emerging technologies. 2004.

Yunas. J. et al., "Polymer-based MEMS electromagnetic actuator for biomedical application: A review," Polymers, vol. 2, Issue 5, 2020, 21 pages.

Zhang. W. et al., "Development of miniature camera module integrated with solid tunable lens driven by MEMS-thermal actuator," Journal of Microelectromechanical Systems, vol. 26, Issue 1, 2016, pp. 84-94.

* cited by examiner

ADAPTIVE DISPLAYS TO ADDRESS THE VERGENCE-ACCOMMODATION CONFLICT

FIELD OF DISCLOSURE

The present disclosure relates to stereoscopy, and in particular to techniques for improving stereo image displays.

BACKGROUND

Advancements in media technology have led to the development of XR technologies, such as virtual reality (VR), augmented reality (AR) and mixed reality (MR) technologies. VR systems may fully immerse (e.g., giving the user a sense of being in an environment) or partially immerse (e.g., giving the user the sense of looking at an environment) users in a three-dimensional (3D), computer-generated environment. AR systems may provide a modified version of reality, such as enhanced information overlaid over real-world objects. MR systems map and merge virtual objects, which are often interactive, to the real world. Such XR systems may utilize wearables (e.g., head-mounted devices, smart glasses, etc.) comprising a stereoscopic display to generate images that convey 3D depth to a user.

Stereoscopic displays utilize stereoscopy, which is a technique for creating or enhancing the illusion of depth in an image by means of stereopsis for binocular vision. One of the major limitations of stereoscopic displays is that the stereo images are displayed on a fixed focal plane. In the human visual system, the muscles in the eye naturally turn the optical axis of an eye to point towards an object of interest allowing the left eye and the right eye to verge on the object of interest. In the 3D world, objects are located at different distances from the human visual system. The human visual system uses the differing distances to perceive depth. However, most immersive content is displayed on displays that are on a fixed viewing plane relative to the human visual system, causing a vergence-accommodation conflict. The vergence-accommodation conflict can result in eye strain, headache, nausea, reduced reaction time, reduced vision clarity, double vision, and similar such ailments. In view of these deficiencies, there exists a desire for improved systems and methods for displaying immersive content.

SUMMARY

Accordingly, techniques and devices are disclosed herein for manipulating a stereoscopic display so that portions of the stereoscopic display are located at varying planes. For example, a device (e.g., head-mounted device) may receive a content item (e.g., a piece of 3D content). The 3D content (content item) may be an image or plurality of images and may correspond to a movie, television show, video game, and/or any other type of 3D content. The device may determine that the 3D content comprises a first object. For example, the 3D content may depict a scene, where the first object is located on or near a first plane and a second object is located on or near a second plane. In some embodiments, describing one or more objects (e.g., first object) as being located on a plane (e.g., first place) or virtual plane may be understood as a location approximation. For example, a portion of the first object may be located on the first plane, but the entire first object may be associated with the first plane as an approximation. In another example, no portion of the first object may be located on the first plane, but the entire object may be associated with the first plane as an approximation because the first object is near the first plane.

In some embodiments, all portions of the first object may be located on the first plane. In response to determining that the 3D content comprises the first object on the first plane, the device may manipulate one or more portions of a display. For example, the device may change a location of a first microdisplay from a first position to a second position based on the first object being depicted on the first plane within the 3D content. The device may then display the 3D content on the display. The portion of the display being changed from the first position to the second position provides depth for rendering the object at a suitable accommodation distance and reduces or eliminates the vergence-accommodation conflict.

The device may repeat this process for subsequent images of the 3D content. For example, a subsequent image of the 3D content may depict the first object on a third plane within the scene. In response to determining that the 3D content depicts the first object on the third plane within the scene, the device may manipulate the one or more portions of the display. For example, the device may change the location of the first microdisplay from the second position to a third position based on the first object being depicted on the third plane within the 3D content. The device may update the positions of the one or more microdisplays according to objects depicted in the 3D content allowing the device to display 3D videos with reduced or eliminated vergence-accommodation conflict.

In some embodiments, each portion of the display corresponds to one or more microdisplays of a plurality of microdisplays, wherein one or more microdisplays of the plurality of microdisplays are adjustable. In some embodiments, a microdisplay refers to a small display (e.g., a display that is less than five centimeters diagonal). The one or more microdisplays may be adjustable due to the device utilizing a micro-electromechanical system (MEMS). For example, a first microdisplay may be attached to one or more telescopic support rods. The device may use the one or more telescopic support rods to adjust the position of the first microdisplay to display 3D content. In some embodiments, each portion of the device corresponds to a portion of a flexible display, wherein one or more portions are adjustable. For example, a first portion of the display may contact one or more micropillars. The device may use the one or more micropillars to adjust the position of the first portion of the display to display 3D content. In another example, a first portion of the display may contact one or more fluid chambers. The device may use the one or more fluid chambers to adjust the position of the first portion of the display to display 3D content.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1A:
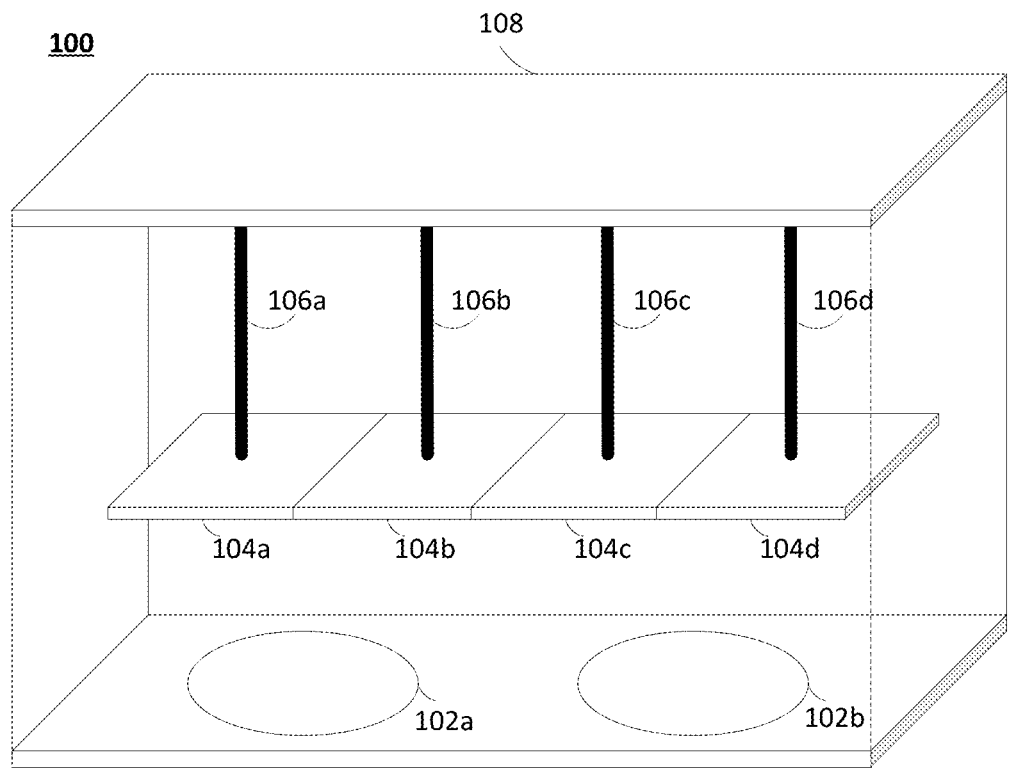
FIGS. 1A and 1B show illustrative diagrams of a device for manipulating a stereoscopic display so that portions of the stereoscopic display are located at varying planes, in accordance with embodiments of the disclosure.
Figure 1B:
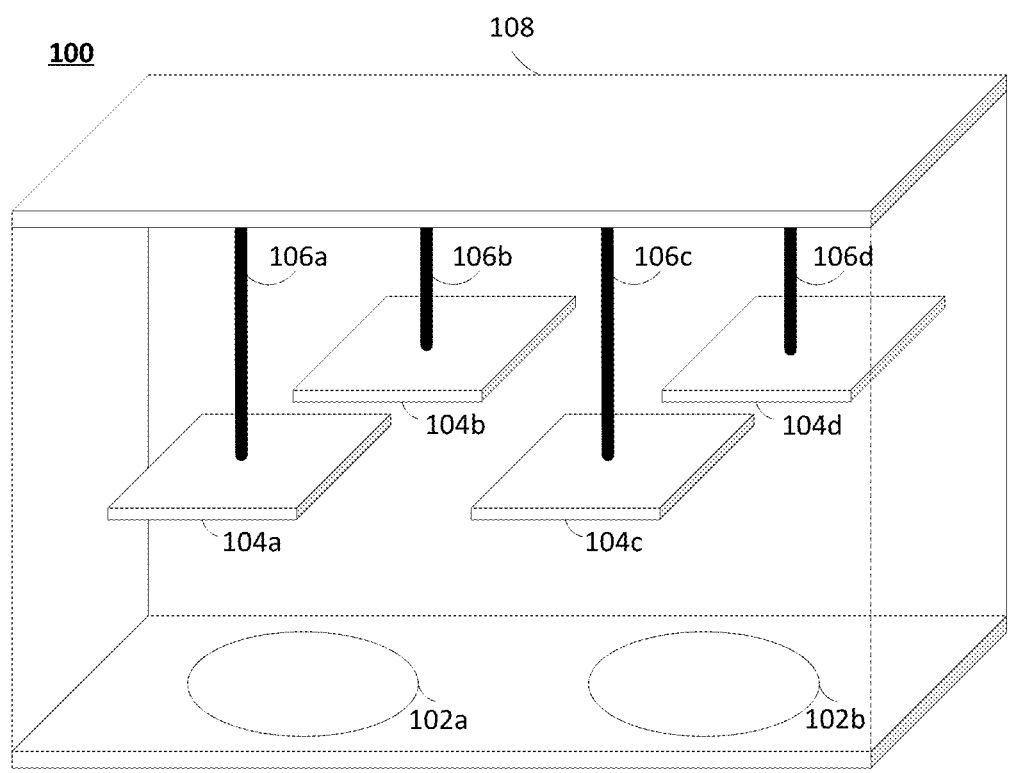

FIGS. 1A and 1B show illustrative diagrams of a device 100 comprising a first lens 102a and a second lens 102b. In some embodiments, the device 100 is a head-mounted device used to display 3D content. The device 100 may also comprise a first microdisplay 104a, a second microdisplay 104b, a third microdisplay 104c, and a fourth microdisplay 104d. In some embodiments, a user views one or more microdisplays by looking through the first lens 102a and/or the second lens 102b. In some embodiments, one or more microdisplays correspond to a lens. For example, the first microdisplay 104a and the second microdisplay 104b may only be visible through the first lens 102a and the third microdisplay 104c and the fourth microdisplay 104d may only be visible through the second lens 102d. The device 100 also comprises a first member 106a, a second member 106b, a third member 106c, and a fourth member 106d coupled to a housing 108. In some embodiments, the members connect one or more microdisplays to the housing 108. For example, the first member 106a may connect the first microdisplay 104a to the housing 108 and the second member 106b may connect the second microdisplay 104b to the housing 108. Although only four microdisplays are shown, any number of microdisplays may be housed within the device 100. For example, the device 100 may comprise 500 microdisplays. Although each microdisplay is connected to the housing 108 with one member, any number of members may be used. For example, the first microdisplay 104a may be connected to the housing 108 by four members. In some embodiments, not all components of the device 100 are shown to avoid overcomplicating the drawing.

In some embodiments, the device 100 receives a piece of 3D content. For example, the device 100 may receive a 3D movie from a server. In some embodiments, the piece of 3D content is an image or plurality of images corresponding to a movie, television show, video game, and/or any other type of 3D content. In some embodiments, the piece of 3D content is in a first format (e.g., a mesh file format, light field file format, etc.). In some embodiments, the first format comprises or defines the geometry, including depth, of one or more objects. In some embodiments, the first format comprises or defines fundamental elements (e.g., polygons comprising the one or more objects in 3D space) related to the one or more objects. The device 100 may determine that the piece of 3D content comprises a first object. For example, the piece of 3D content may depict a scene comprising a house and a cloud, where the first object (e.g., cloud) is located on a first plane and a second object (e.g., house) is located on a second plane. In some embodiments, the device 100 determines that the piece of 3D content comprises the first object using metadata associated with the piece of 3D content. For example, the device 100 may receive metadata associated with the piece of 3D content before/after the device 100 receives the piece of 3D content, wherein the metadata indicates that the piece of 3D content comprises 3D objects. In another example, the device 100 may receive metadata associated with the piece of 3D content when the device 100 receives the piece of 3D content. The metadata may also provide information about one or more objects displayed in the piece of 3D content. For example, the metadata may indicate location information relating to the first object displayed in the piece of 3D content. The location information may comprise coordinates related to one or more objects displayed in the piece of 3D content, indicators specifying plane information related to the one or more object displayed in the piece of 3D content, and/or similar such information. In some embodiments, the piece of 3D content comprises the metadata.

The device 100 may manipulate one or more microdisplays in response to determining that the piece of 3D content comprises the first object. For example, the device 100 may determine that the first object is located on a first plane within the scene and a second object is located on a second plane within the scene. The device 100 may then determine one or more locations for the microdisplays according to the planes associated with the objects in the scene. For example, the device 100 may calculate a position for the second microdisplay 106b to display the first object based on a focal length of the first lens 102a and the first object being located on the first plane within the scene. The device 100 may then change the positions of one or more microdisplays to display the objects according to the objects being located on varying planes within the scene. For example, the device 100 may change the second microdisplay 104b from a first position (e.g., FIG. 1A) to a second position (e.g., FIG. 1B). The device 100 may also change the fourth microdisplay 104d from a first position (e.g., FIG. 1A) to a second position (e.g., FIG. 1B). In some embodiments, the change in positions of the second microdisplay 104b and the fourth microdisplay 104d may be the same. In some embodiments, the change in positions of the second microdisplay 104b and the fourth microdisplay 104d may be different. For example, the distance between the second microdisplay 104b and the first lens 102a may need to be closer or farther than the distance between the fourth microdisplay 104d and the second lens 102b to provide the stereoscopic display of the piece of 3D content.

In some embodiments, the device 100 changes the position of the second microdisplay 104b using the second member 106b and changes the position of the fourth microdisplay 104d using the fourth member 106d. For example, the second member 106b and the fourth member 106d may be telescopic support rods that can be used to change the positions of the second microdisplay 104b and the fourth microdisplay 104d. In another example, the second member 106b and the fourth member 106d may be fluid chambers that can be used to change the positions of the second microdisplay 104b and the fourth microdisplay 104d. In some embodiments, the device 100 utilizes a MEMS comprising the second member 106b and the fourth member 106d to change the positions of the second microdisplay 104b and the fourth microdisplay 104d. In some embodiments, all the members (106a-106d) are the same type of members. For example, all the members may be telescopic support rods. In some embodiments, the members (106a-106d) are not the same type of members. For example, the first member 106a and the second member 106b may be fluid chambers and the third member 106c and the fourth member 106d may be telescopic support rods.

The device 100 may then display the first object using the second microdisplay 104b and the fourth microdisplay 104d. In some embodiments, the device 100 displays the second object using the first microdisplay 104a and the third microdisplay 104c. A user may view the first microdisplay 104a and the second microdisplay 104b using their left eye and view the third microdisplay 104c and the fourth microdisplay 104d using their right eye. In some embodiments, the device 100 displaying the first object using microdisplays (e.g., the second microdisplay 104b and the fourth microdisplay 104d) on different planes than microdisplays (e.g., the first microdisplay 104a and the third microdisplay 104c) displaying the second object provides depth and reduces or eliminates the vergence-accommodation conflict. In some embodiments, the microdisplays are arranged so that the user is unable to observe gaps between the microdisplays.

In some embodiments, the device 100 further comprises fiber optic fabric. The fiber optic fabric may be connected between microdisplays. For example, a first fiber optic fabric may be connected between the first microdisplay 104a and the second microdisplay 104b. In some embodiments, fiber optic fabric ensures that there are no observable gaps between microdisplays. In some embodiments, boundaries of the microdisplays are propagated to the fiber optic fabric. For example, a fiber optic fabric may be connected to a first edge of the first microdisplay 104a and a first edge of the second microdisplay 104b. The first edge of the first microdisplay 104a may display one or more colors. The one or more colors may be propagated onto the fiber optic fabric. In some embodiments, the fiber optic fabric displaying the one or more colors of the first edge of the first microdisplay 104a provides continuity between the first microdisplay 104a and the second microdisplay 104b.

Figure 2A:
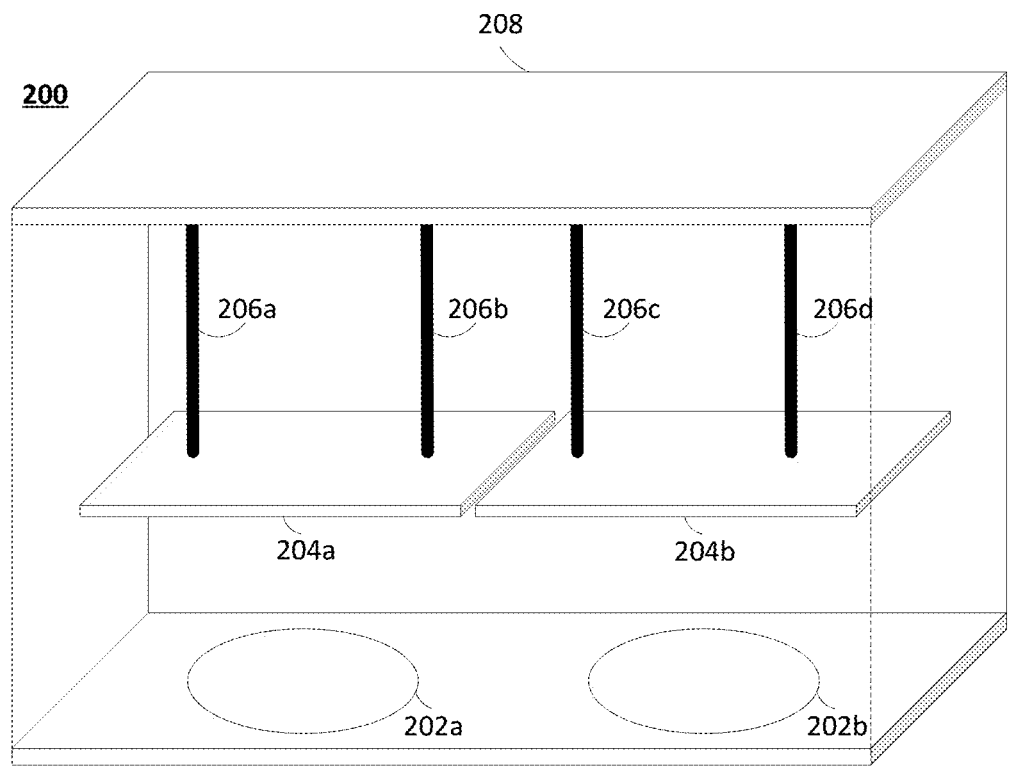
FIGS. 2A and 2B show illustrative diagrams of another device for manipulating a stereoscopic display so that portions of the stereoscopic display are located at varying planes, in accordance with embodiments of the disclosure.
Figure 2B:
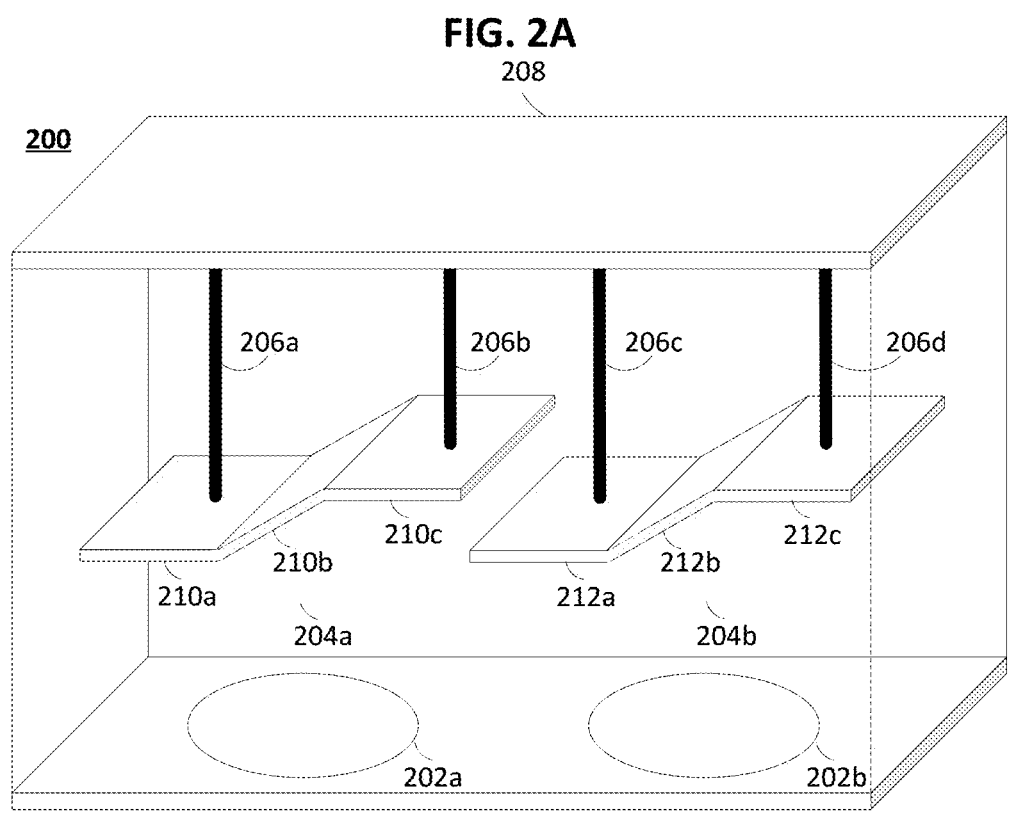

FIGS. 2A and 2B show illustrative diagrams of a device 200 comprising a first lens 202a and a second lens 202b. In some embodiments, the device 200 is a head-mounted device used to display 3D content. The device 200 may also comprise a first microdisplay 204a and a second microdisplay 204b. In some embodiments, a user views one or more microdisplays by looking through the first lens 202a and/or the second lens 202b. In some embodiments, one or more microdisplays correspond to a lens. For example, the first microdisplay 204a is only visible through the first lens 202a and the second microdisplay 204b may only be visible through the second lens 202d. In some embodiments, the first microdisplays 204a and the second microdisplays 204b are flexible. Although the first microdisplay 204a and the second microdisplay 204b are shown as two separate displays, the first microdisplay 204a and the second microdisplay 204b may be two portions of one single display.

The device 200 also comprises a first member 206a, a second member 206b, a third member 206c, and a fourth member 206d coupled to a housing 208. In some embodiments, the members connect the microdisplays to the housing 208. For example, the first member 206a and the second member 206b may connect the first microdisplay 204a to the housing 208 and the third member 206c and the fourth member 206d may connect the second microdisplay 204b to the housing 208. Although only two microdisplays are shown, any number of microdisplays may be housed within the device 200. Although each microdisplay is connected to the housing 208 with two members, any number of members may be used. In some embodiments, not all components of the device 200 are shown to avoid overcomplicating the drawing.

In some embodiments, the device 200 receives a piece of 3D content and determines that the piece of 3D content comprises a first object. In some embodiments, the device 200 receives the piece of 3D content and/or determines that the piece of 3D content comprises the first object using the same or similar methodologies as described above in FIGS. 1A and 1B.

The microdisplays may comprise one or more portions. For example, the device 200 may comprise a first portion 210a of the first microdisplay 204a, a second portion 210b of the first microdisplay 204a, and a third portion 210c of the first microdisplay 204a. The device 200 may also comprise a first portion 212a of the second microdisplay 204b, a second portion 212b of the second microdisplay 204b, and a third portion 212c of the second microdisplay 204b.

The device 200 may manipulate one or more microdisplays and/or portions of one or more microdisplays in response to determining that the piece of 3D content comprises the first object. For example, the device 200 may determine that the first object may be located on a first plane within the scene and a second object is located on a second plane within the scene. The device 200 may then determine one or more locations for portions of the microdisplays according to the planes associated with the objects in the scene. For example, the device 200 may calculate a position for the third portion 210c of the first microdisplay 204a to display the first object based on a focal length of the first lens 202a and the first object being located on the first plane within the scene. The device 200 may then change the positions of one or more portions of the microdisplays to display one or more objects according to the one or more objects being located on varying planes within the scene. For example, the device 200 may change the third portion 210c of the first microdisplay 204a from a first position (e.g., FIG. 2A) to a second position (e.g., FIG. 2B). The device 200 may also change the third portion 212c of the second microdisplay 204b from a first position (e.g., FIG. 2A) to a second position (e.g., FIG. 2B). In some embodiments, the change in positions of the third portion 210c of the first microdisplay 204a and the third portion 212c of the second microdisplay 204b may be the same. In some embodiments, the change in positions of the third portion 210c of the first microdisplay 204a and the third portion 212c of the second microdisplay 204b may be different. For example, the distance between the third portion 210c of the first microdisplay 204a and the first lens 202a may need to be closer or farther than the distance between the third portion 212c of the second microdisplay 204b and the second lens 202b to provide the stereoscopic display of the 3D content.

In some embodiments, the device 200 changes the position of the third portion 210c of the first microdisplay 204a using the second member 206b and changes the position of the third portion 212c of the second microdisplay 204b using the fourth member 206d. In some embodiments, the members are telescopic support rods, fluid chambers, micropillars, and/or similar such components able to change the positions of one or more portions of a microdisplay. In some embodiments, the device 200 utilizes a MEMS comprising one or more members to change the positions of the third portion 210c of the first microdisplay 204a and the third portion 212c of the second microdisplay 204b. In some embodiments, all the members (206a-206d) are the same type of members. In some embodiments, the members (206a-206d) are not the same type of members.

The device 200 may then display the piece of 3D content using the first microdisplay 204a and the second microdisplay 204b. In some embodiments, the device 200 displays the first object using the third portion 210c of the first microdisplay 204a and the third portion 212c of the second microdisplay 204b. In some embodiments, the device 200 displays the second object using the first portion 210a of the first microdisplay 204a and the first portion 210a of the second microdisplay 204b. A user may view the first microdisplay 204a using their left eye and view the second microdisplay 204b using their right eye. In some embodiments, the device 200 displaying the first object using portions of the microdisplays (e.g., third portion 210c of the first microdisplay 204a and third portion 212c of the second microdisplay 204b) on different planes than portions of microdisplays (e.g., first portion 210a of the first microdisplay 204a and first portion 212a of the second microdisplay 204b) displaying the second object provides depth and reduces or eliminates the vergence-accommodation conflict.

In some embodiments, the device 200 alters the display of the piece of 3D content based on the position and/or orientation of one or more portions of a microdisplay. For example, the device 200 may alter the 3D content displayed on the second portion 210b of the first microdisplay 204a and the second portion 212b of the second microdisplay 204b based on the orientations of the second portion 210b of the first microdisplay 204a and the second portion 212b of the second microdisplay 204b.

In some embodiments, one or more portions of a microdisplay corresponds to a fiber optic fabric. For example, the second portion 210b of the first microdisplay 204a and the second portion 212b of the second microdisplay 204b may correspond to fiber optic fabric. In some embodiments, the fiber optic fabric is connected between microdisplays and/or portions of microdisplays. For example, a fiber optic fabric (e.g., the second portion 210b of the first microdisplay 204a) may be connected between the first portion 210a of the first microdisplay 204a and the third portion 210c of the first microdisplay 204a. In some embodiments, fiber optic fabric ensures that there are no observable gaps between microdisplays. In some embodiments, boundaries of the microdisplays and/or portions of microdisplays are propagated to the fiber optic fabric. For example, fiber optic fabric (e.g., the second portion 210b of the first microdisplay 204a) may be connected to a first edge of the first portion 210a of the first microdisplay 204a and a first edge of the third portion 210c of the first microdisplay 204a. The first edge of the first portion 210a of the first microdisplay 204a may display one or more colors. The one or more colors may be propagated onto the fiber optic fabric (e.g., the second portion 210b of the first microdisplay 204a). In some embodiments, the fiber optic fabric (e.g., the second portion 210b of the first microdisplay 204a) displaying the one or more colors of the first edge of the first portion 210a of the first microdisplay 204a provides continuity between the first portion 210a of the first microdisplay 204a and the third portion 210c of the first microdisplay 204b.

Figure 3A:
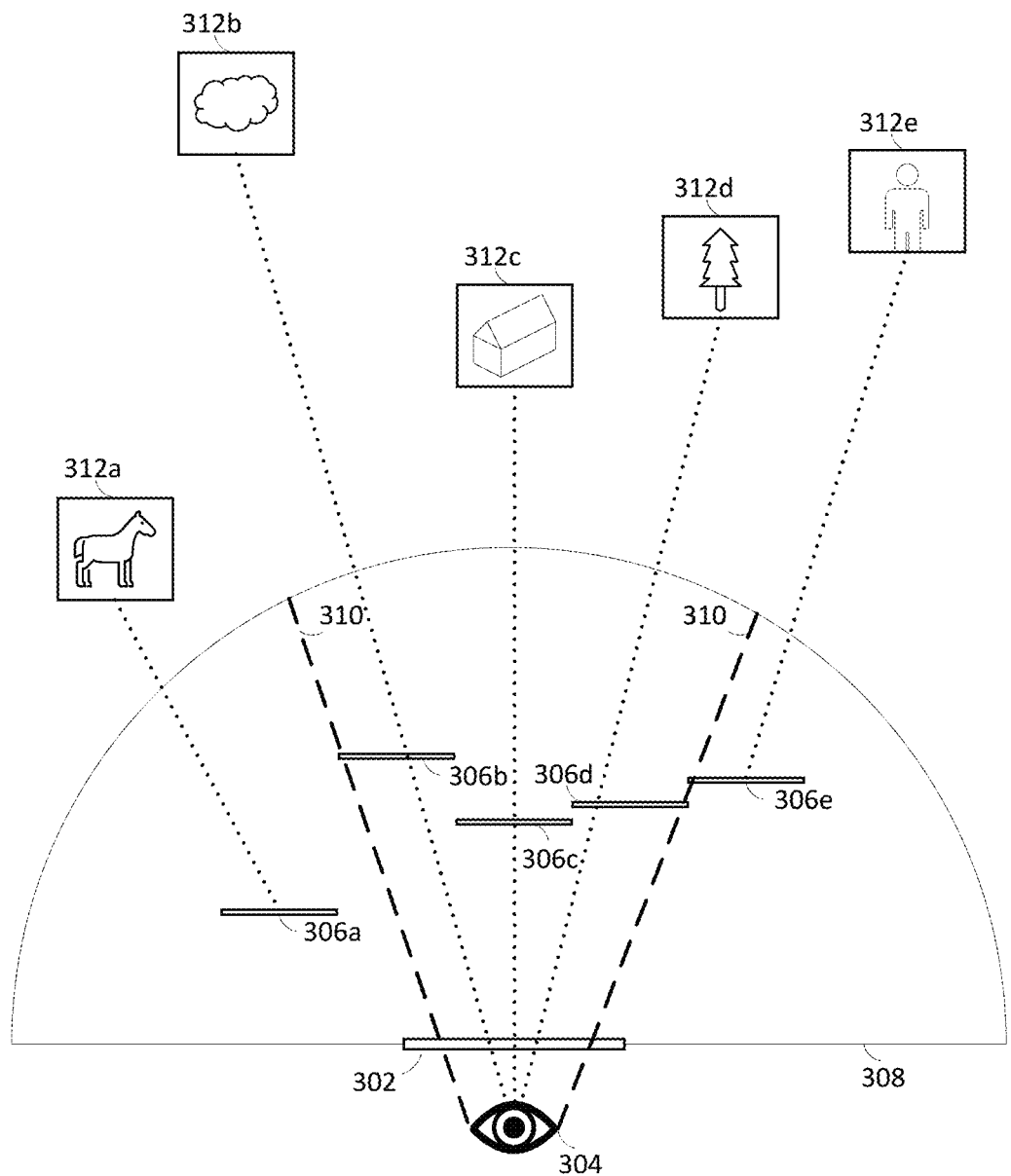
FIGS. 3A-3C show illustrative diagram of another device for manipulating a stereoscopic display so that portions of the stereoscopic display are located at varying planes, in accordance with embodiments of the disclosure.
Figure 3B:
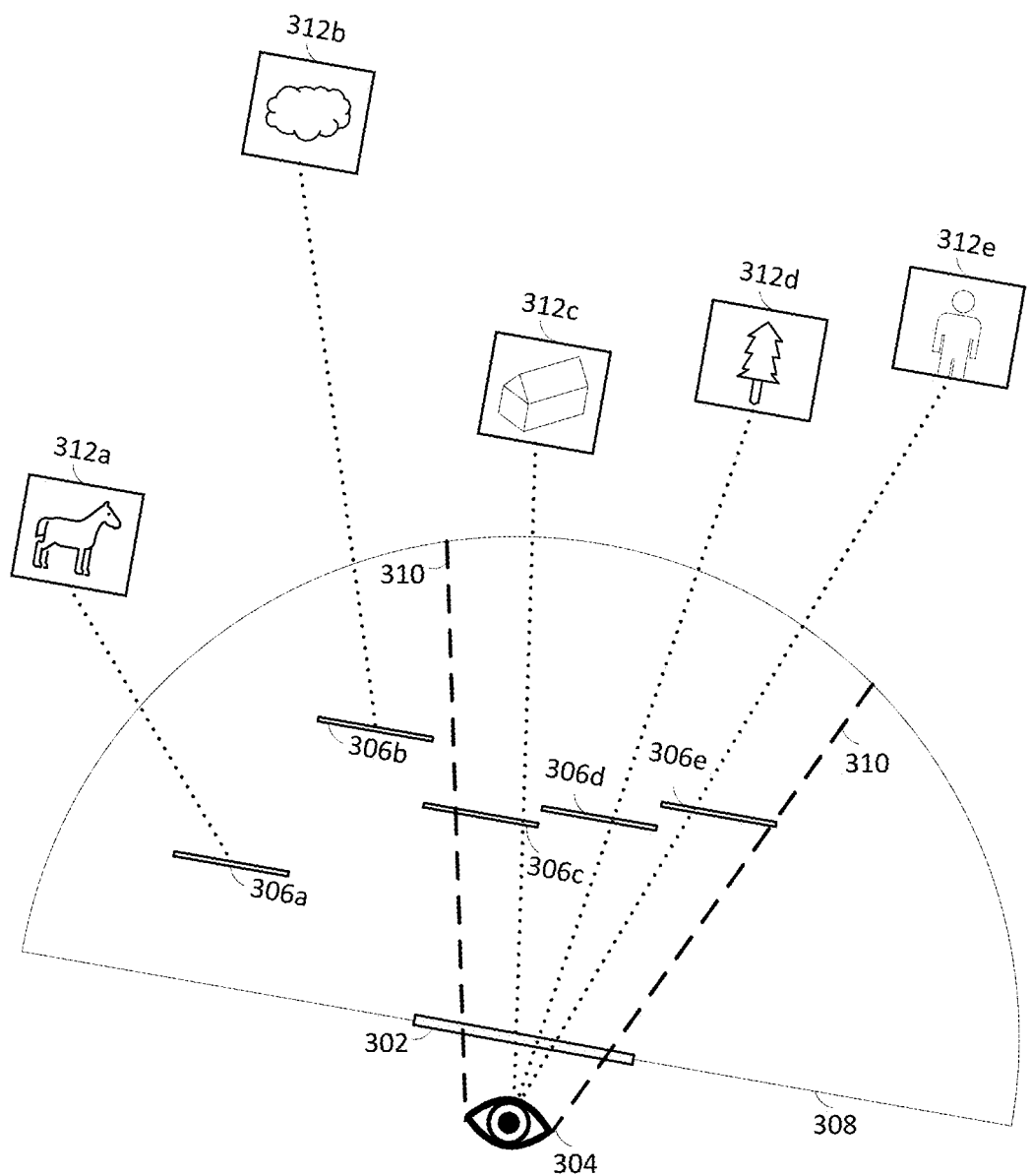
Figure 3C:
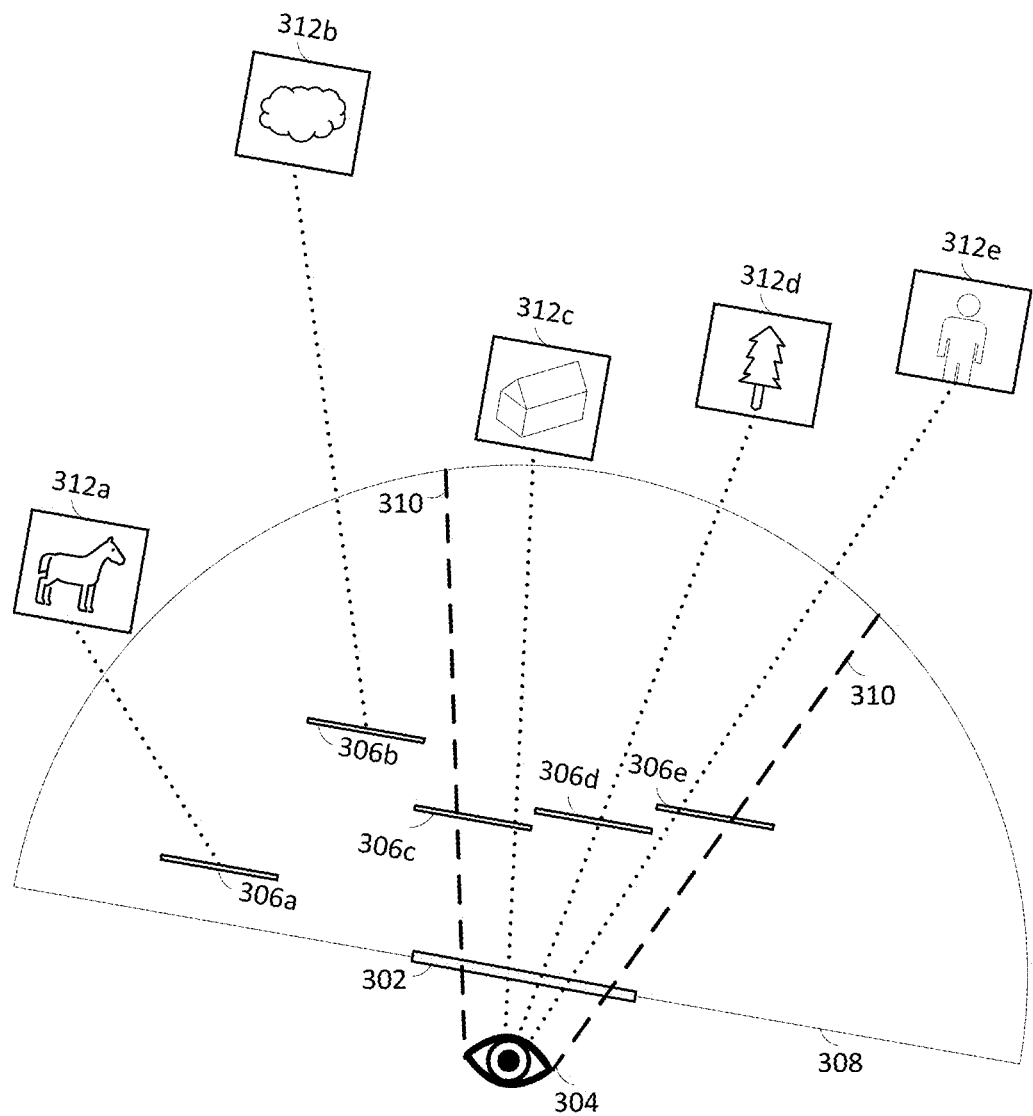

FIGS. 3A-3C show illustrative diagrams of a device 300 comprising a lens 302. In some embodiments, the device 300 is a component of a second device (e.g., device 100). For example, a user 304 may use their left eye to look through the lens 302 of the device 300 and may use their right eye to look through a different lens (e.g., second lens 102b) of a different component of the second device (e.g., device 100). Although only one component of a second device is described in FIGS. 3A-3C, additional components may use the same or similar methodologies and technology described herein.

In some embodiments, the device 300 is a component of a head-mounted device used to display 3D content. The device 300 may also comprise a first microdisplay 306a, a second microdisplay 306b, a third microdisplay 306c, a fourth microdisplay 306d, and a fifth microdisplay 306e. In some embodiments, the user 304 views one or more microdisplays by looking through the lens 302. In some embodiments, the lens 302 provides a field of view 310 that is visible to the user 304. The device 300 may also comprise one or more members (not shown) used to connect the microdisplays to a housing 308. Although only five microdisplays are shown, any number of microdisplays may be housed within the device 300. In some embodiments, not all components of the device 300 are shown to avoid overcomplicating the drawing.

In some embodiments, the device 300 displays a piece of 3D content on the microdisplays. The device 300 may determine that the piece of 3D content comprises a scene with a plurality of objects using one or more of the methodologies described herein. For example, the piece of 3D content may comprise a first object 312a at a first location within the piece of 3D content, a second object 312b at a second location within the piece of 3D content, a third object 312c at a third location within the piece of 3D content, a fourth object 312d at a fourth location within the piece of 3D content, and a fifth object 312e at a fifth location within the piece of 3D content. In response to determining that the piece of 3D content comprises a plurality of objects, the device 300 may change the positions of one or more microdisplays according to the locations of the plurality of objects within the scene. For example, the device 300 may determine that the first microdisplay 306a will display the first object 312a and change the position of the first microdisplay 306a to a first position based on the location of the first object 312a within the piece of 3D content. The device 300 may also determine that the second microdisplay 306b will display the second object 312b and change the position of the second microdisplay 306b to a second position based on the location of the second object 312b within the piece of 3D content. The device 300 may also determine that the third microdisplay 306c will display the third object 312c and change the position of the third microdisplay 306c to a third position based on the location of the third object 312c within the piece of 3D content. The device 300 may also determine that the fourth microdisplay 306d will display the fourth object 312d and change the position of the fourth microdisplay 306d to a fourth position based on the location of the fourth object 312d within the piece of 3D content. The device 300 may also determine that the fifth microdisplay 306e will display the fifth object 312e and change the position of the fifth microdisplay 306e to a fifth position based on the location of the fifth object 312e within the piece of 3D content.

The device 300 may receive an input during the display of the 3D content. The input may correspond to the device 300 changing positions and/or orientations. For example, the device 300 may receive an input when the user 304 moves their head (e.g., pan, tilt, roll, walk in a direction, etc.). The device 300 may comprise one or more sensors (e.g., accelerometers, gyroscopes, image sensors, depth sensors, light detection and ranging (LiDAR) sensors, and/or any similar such sensor) able to detect a change in position and/or orientation of the device 300. In some embodiments, the one or more sensors may be external to the device 300. In response to the one or more sensors detecting a change in position and/or orientation, the device 300 may receive a first input from the one or more sensors. In some embodiments, the input may correspond to a change in the gaze of the user 304. For example, the device 300 may use one or more sensors to perform eye-tracking on the user 304 to determine that the user 304 is looking to the right. In some embodiments, the user 304 looking to the right causes the device 304 to move one or more microdisplays and/or change what one or more microdisplays are displaying.

In some embodiments, the device 300 updates the position of one or more microdisplays based on a received input. For example, the device 300 may display the piece of 3D content using all the microdisplays 306a-306e. In some embodiments, the device 300 controls or positions the one or more microdisplays to display a part of the piece of 3D content that are outside a present field of view 310 of the user 304. For example, the device 300 may control a position of the first microdisplay 306a to display the first object 312a when the field of view 310 shifts to include the first object 312a, and may control a position of the fifth microdisplay 306e to display the fifth object 312e when the field of view 310 shifts to include the fifth object 312e. If the user 304 pans their head to the right, the device 300 may receive a first input from a first sensor (e.g., accelerometer) indicating that the device 300 has changed positions. In response to the first input, the device 300 may move the positions of one or more microdisplays according to the change in position of the device 300. For example, the device 300 may change the microdisplays from the starting positions (e.g., shown in FIG. 3A) to updated positions (e.g., shown in FIG. 3B) in response to the first input. The device 300 changing the positions of the microdisplays in response to the first input simulates a 3D environment for the user 304. For example, in FIG. 3A, the user 304 was unable to view the fifth object 312e because the fifth object 312e was outside the field of view 310 of the user 304. When the user 304 pans their head to the right, the device 300 then changes the positions of the microdisplays so that a new object (e.g., fifth object 312e displayed by the fifth microdisplay 306e) enters the field of view 310 of the user 304 simulating a 3D environment.

In some embodiments, the received input may include changes in multiple directions. For example, the user 304 may pan their head to the right and walk forward or otherwise provide an input to move their field of view forward (e.g., toward the displayed objects) at the same time. In such an example, the device 300 may receive a second input from a sensor (e.g., accelerometer) or other controller indicating that the device 300 has changed positions and orientations. In response to the second input, the device 300 may move the positions of one or more microdisplays according to the change in position and orientation of the device 300. For example, the device 300 may change the microdisplays from the starting positions (e.g., shown in FIG. 3A) to second updated positions (e.g., shown in FIG. 3C) in response to the second input. FIG. 3C displays the fifth microdisplay 306e entering the field of view 310 of the user 304, as well as the microdisplays being closer to the lens 302, which corresponds to a depth of the objects or depth of a virtual plane of the objects being reduced. The second updated positions result in the user 304 being able to see the fifth object 312e. The second updated positions also result in the user 304 observing the third object 312c, fourth object 312d, and fifth object 312e moving closure. Accordingly, the second updated positions simulate the user 304 panning their head to the right while walking or moving toward the displayed objects.

In some embodiments, the device 300 uses the received input to determine a speed for changing the position of one or more of the microdisplays. For example, if the received input indicates that the user 304 pans their head quickly to the right, the device 300 may change the microdisplays from the starting positions to the updated positions at a first speed, and if the received input indicates that the user 304 pans their head slowly to the right, the device 300 may change the microdisplays from the starting positions to the updated positions at a second speed that is slower than the first speed. In some embodiments, the received input comprises acceleration and/or velocity measurements related to the device 300. In some embodiments, the received input comprises position information (e.g., coordinates of the device 300) related to the device 300. In some embodiments, the device 300 is programmed to change the positions of microdisplays at different planes at different speeds. For example, in response to receiving an input, the device 300 may change the third microdisplay 306c from the starting position (e.g., as shown in FIG. 3A) to the updated position (e.g., as shown in FIG. 3B) at a first speed and may change the fifth micro display 306e from the starting position (e.g., as shown in FIG. 3A) to the updated position (e.g., as shown in FIG. 3B) at a second faster speed. In some embodiments, the device 300 is programmed to change the positions of the microdisplays at different speeds to provide a real-world experience. For example, the device 300 may change the position of the fifth microdisplay 306e at a first speed so that the user 304 observes a first object, displayed on the fifth microdisplay 306e, moving as if the user 304 was viewing the object in the real world.

In some embodiments, the device 300 updates the objects being displayed by the microdisplays in response to an input. For example, the microdisplays may display the objects shown in FIG. 3A. The device 300 may receive a third input (e.g., the user 304 stepping or moving to the right). In response to the third input, the device 300 may change the display of the microdisplays so that the second microdisplay 306b displays the third object 312c, the third microdisplay 306c displays the fourth object 312d, and the fourth microdisplay 306d displays the fifth object 312e. The device 300 may also update the positions of one or more microdisplays based on the objects displayed. For example, the device 300 may change the position of the second microdisplay 306b based on the location of the third object 312c within the piece of 3D content. The device 300 may also change the position of the third microdisplay 306c based on the location of the fourth object 312d within the piece of 3D content. The device 300 may also change the position of the fourth microdisplay 306d based on the location of the fifth object 312e within the piece of 3D content.

In some embodiments, the device 300 updates the positions of one or more microdisplays and/or the objects being displayed by one or more microdisplays in response to an input. For example, the microdisplays may display the objects shown in FIG. 3A. The device 300 may determine that the scene depicted in the piece of 3D content comprises one or more objects behind the user 304. For example, the scene depicted in the piece of 3D content may comprise a sixth object, a seventh object, and an eighth object located behind the user 304. The device 300 may receive a fourth input (e.g., the user 304 turns around). In response to the fourth input, the device 300 may change the display and/or positions of the microdisplays to reflect the objects (e.g., sixth object, seventh object, and eighth object) that have entered into the field of view 310 of the user 304. For example, in response to the fourth input, the device 300 may change the display of the microdisplays so that the second microdisplay 306b displays the sixth object, the third microdisplay 306c displays the seventh object, and the fourth microdisplay 306d displays the eighth object. The device 300 may also change the position of the second microdisplay 306b to a first updated position based on the location of the sixth object within the piece of 3D content. The device 300 may also change the position of the third microdisplay 306c to a second updated position based on the location of the seventh object within the piece of 3D content. The device 300 may also change the position of the fourth microdisplay 306d to a third updated position based on the location of the eighth object within the piece of 3D content. Although the above example is described using an example of the user 304 turning around, the same or similar methods may be applied to a user 304 turning any distance (e.g., 90 degrees, 150 degrees, 190 degrees, 270 degrees, etc.).

The device 300 may change the positions of the microdisplays using one or more members. For example, the first microdisplay 306a may be attached to the housing 308 using a first member. The device 300 may us the first member to change the starting position of first microdisplay 306a (e.g., as shown in FIG. 3A) to an updated position (e.g., as shown in FIG. 3B). In some embodiments, the one or members are telescopic support rods, micropillars, fluid chambers, and/or similar such members. In some embodiments, the device 300 uses a combination of gears and sliders to change the positions of one or more microdisplays. Although FIGS. 3A and 3B display an embodiment where the user 304 pans to the right, the device 300 may also respond to other movements. For example, the device 300 may receive a second input indicating that the user 304 tilted their head down. The device 300 may move the positions of the microdisplays vertically in the y-direction at a first speed according to the received second input. In some embodiments, the device 300 may comprise additional microdisplays (not shown) below and/or above the displayed microdisplays. In such an embodiment, the additional microdisplays may be outside the field of view 310 of the user 304 in the y-direction. If the devices 300 moves the positions of the microdisplays and the additional microdisplays vertically in the y-direction, in response to the second input, then one or more of the additional microdisplays may become visible to the user 304.

Figure 4:
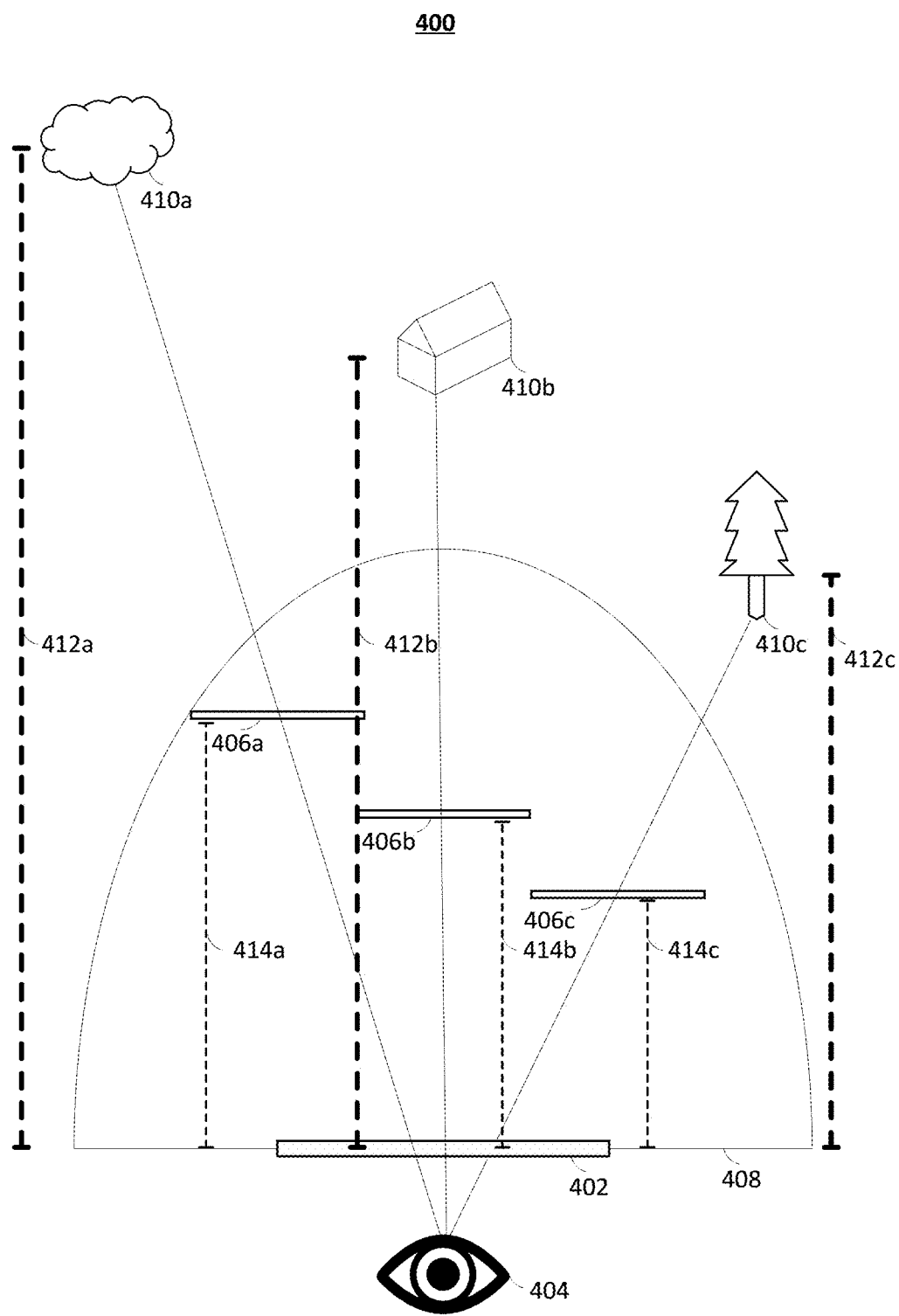
FIG. 4 shows an illustrative diagram of parameters used to determine positions for one or more portions of a display, in accordance with embodiments of the disclosure.

FIG. 4 shows an illustrative diagram of parameters used to determine positions for one or more portions of a display of a device 400, in accordance with embodiments of the disclosure. In some embodiments, the device 400 comprises a lens 402. In some embodiments, the device 400 is a component of a second device (e.g., device 100). For example, a user 404 may use their left eye to look through the lens 402 of the device 400 and may use their right eye to look through a different lens (e.g., second lens 102b) of a different component of the second device (e.g., device 100). Although only one component of a second device is described in FIG. 4, additional components may use the same or similar methodologies and technology described herein.

In some embodiments, the device 400 is a component of a head-mounted device used to display 3D content. The device 400 may comprise a first microdisplay 406a, a second microdisplay 406b, and a third microdisplay 406c. The device 400 may also comprise one or more members (not shown) used to connect the microdisplays to a housing 408. Although only three microdisplays are shown, any number of microdisplays may be housed within the device 400. In some embodiments, not all components of the device 400 are shown to avoid overcomplicating the drawing.

In some embodiments, the device 400 receives a piece of 3D content. The piece of the 3D content may depict a scene comprising a plurality of objects from a first viewpoint. For example, a piece of 3D content may depict a scene of a landscape from the viewpoint of the camera filming the landscape. The scene may comprise a first object 410a, a second object 410b, and a third object 410c. In some embodiments, the plurality of objects are located at different positions within the scene. For example, the first object 410a may be a first distance 412a from the first viewpoint, the second object 410b may be a second distance 412b from the first viewpoint, and the third object 410c may be a third distance 412c from the first viewpoint. The device 400 may use the focal length of the lens 402 and the positions of the plurality of objects within the scene to determine what locations the one or more microdisplays should be changed to when displaying the piece of 3D content.

For example, from the Gaussian Thin Lens formula:

$$1/z + 1/d = 1/f \rightarrow 1/d = 1/f - 1/v \rightarrow d = (f*z)/(z-f) \quad (1)$$

Where,
f: focal length of the lens 402.
d: distance between lens 402 and a microdisplay.
z: distance between the viewpoint and an object in the piece of 3D content.

In some embodiments, the device 400 uses Equation (1) to determine a location for one or more microdisplays. For example:

$$d_1 = (f*z_1)/(z_1 - f) \quad (2)$$

Where,
f: focal length of the lens 402.
$d_1$: distance 414a between lens 402 and the first microdisplay 406a.
$z_1$: distance 412a between the viewpoint and the first object 410a in the piece of 3D content.

In another example:

$$d_2 = (f * z_2)/(z_2 - f) \quad (3)$$

Where,
f: focal length of the lens 402.
$d_2$: distance 414b between lens 402 and the second microdisplay 406b.
$z_2$: distance 412b between the viewpoint and the second object 410b in the piece of 3D content.

In another example:

$$d_3 = (f * z_3)/(z_3 - f) \quad (4)$$

Where,
f: focal length of the lens 402.
$d_3$: distance 414c between lens 402 and the third microdisplay 406c.
$z_3$: distance 412c between the viewpoint and the third object 410c in the piece of 3D content.

In some embodiments, the lens 402 has a focal length of 30 millimeters (mm) and the first distance 412a between the viewpoint and the first object 410a in the piece of 3D content is 100 mm. Using these measurements and Equation (2) the device may determine that the distance 414a between the first microdisplay 406a and the lens 402 should be 42.85 mm. The device 400 may cause the first microdisplay 406a to change from a starting position to the calculated distance 414a to display the first object 410a for the user 404.

In some embodiments, the first object 410a may change distances from the first viewpoint during the piece of 3D content. For example, the piece of 3D content may comprise a plurality of segments. In some embodiments, the plurality of segments represent various portions and/or parts of the piece of 3D content. For example, a first segment may relate to the beginning of the piece of 3D content and a second segment may relate to the end of the piece of 3D content. In another example, a first segment may relate to a first part of the piece of 3D content displaying virtual objects in a first configuration and a second segment may relate to a second part of the piece of 3D content displaying virtual objects in a second configuration. In some embodiments, each segment corresponds to a length of time of the piece of 3D content. For example, if the piece of 3D content is four seconds long, then a first segment may correspond to the first two seconds of the piece of 3D content and a second segment may correspond to the second two seconds of the piece of 3D content. In some embodiments, the first object 410a may be a first distance 412a from the first viewpoint during a first segment of the piece of 3D content and may be a different distance from the first viewpoint during a second segment of the piece of 3D content. In some embodiments, the device 400 uses the focal length of the lens 402 and the different distance from the first viewpoint during the second segment of the piece of 3D content to determine an updated location for the first microdisplay 406a. For example, if the focal length is 30 mm and the different distance between the viewpoint and the first object 410a in the second segment of the piece of 3D content is 110 mm, then the device 400 may use Equation (2) to determine an updated distance between the first microdisplay 406a and the lens 402 to be 41.25 mm. In some embodiments, the device 400 may cause the first microdisplay 406a to change from the first distance 414a to the updated distance to display the first object 410a for the user 404 during the second segment of the piece of the 3D content.

In some embodiments, the device 400 determines a speed at which to move the one or more microdisplays. For example, the device 400 may determine a speed at which to move the first microdisplay 406a from the first distance 414a to the updated distance to display the first object 410a for the user 404 during the second segment of the piece of the 3D content. The device may determine a first speed corresponding to the change in which the first object 410a changes from the first distance 412a from the first viewpoint to the updated distance. In some embodiments, Equation (2) can be modified so that:

$$d_1' = (f(z_1 + S))/((z_1 + S) - f) \quad (5)$$

$d_1'$: new distance between lens 402 and the first microdisplay 406a.
$z_1$: distance 412a between the viewpoint and the first object 410a in the piece of 3D content.
S: distance per second in which the first object 410a changes from the first distance 412a from the first viewpoint to the updated distance from the first viewpoint.

Equation (5) and Equation (2) may be used to find a second speed corresponding to the change of the first microdisplay 406a from the distance 414a between the first microdisplay 406a and the lens 402 to the new distance between the first microdisplay 406a and the lens 402. For example:

$$S_d = d_1' - d_1 = [(f(z_1 + S))/((z_1 + S) - f)] - [(f * z_1)/(z_1 - f)] = \quad (6)$$
$$[f((z_1 + S)(z_1 - f) - z_1(z_1 + S - f))]/$$
$$[(z_1 + S - f)(z_1 - f)] = -S * f^2/[(z_1 + S - f)(z_1 - f)]$$

$S_d$: distance per second in which the first microdisplay 406a changes from the distance 414a between the first microdisplay 406a and the lens 402 to the new distance ($d_1'$) between the first microdisplay 406a and the lens 402.

In some embodiments, if $z_1$ (the distance 412a between the viewpoint and the first object 410a in the piece of 3D content) is much larger than S (distance per second in which the first object 410a changes from the first distance 412a from the first viewpoint to the updated distance) and f (focal length of the lens 402) then Equation (6) can be simplified to:

$$S_d = -S * f^2/z_1^2 \quad (7)$$

In some embodiments, the device 400 changes the focal length of the lens 402 to reduce the speed at which the device 400 would have to move the first microdisplay 406a to display the first object 410a changing distances relative to the first viewpoint of the piece of 3D content. In some embodiments, the device 400 manipulates the display of the piece of 3D content so that the distance 412a between the viewpoint and the first object 410a in the piece of 3D content is larger. The larger distance between the viewpoint and the first object 410a reduces the speed at which the first microdisplay 406a would have to move the first microdisplay 406a to display the first object 410a changing distances relative to the first viewpoint of the piece of 3D content. In some embodiments, the device uses a combination of methodologies to reduce the speed at which the first microdisplay 406*a* would have to move to display the first object 410*a* changing distances relative to the first viewpoint of the piece of 3D content.

Figure 5A:
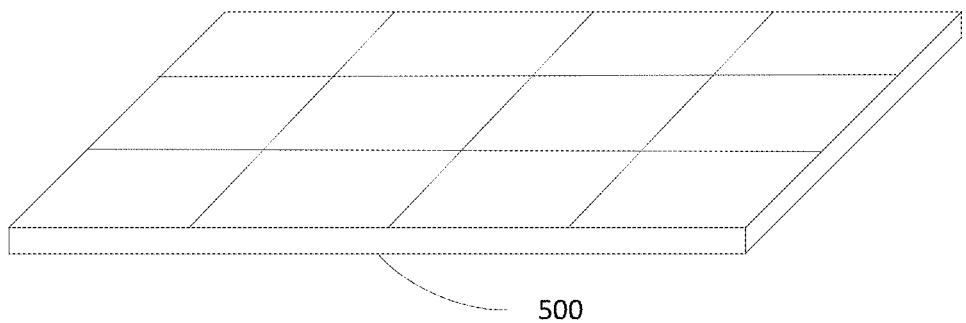
FIGS. 5A and 5B show illustrative diagrams of displays comprising multiple portions, in accordance with embodiments of the disclosure.
Figure 5B:
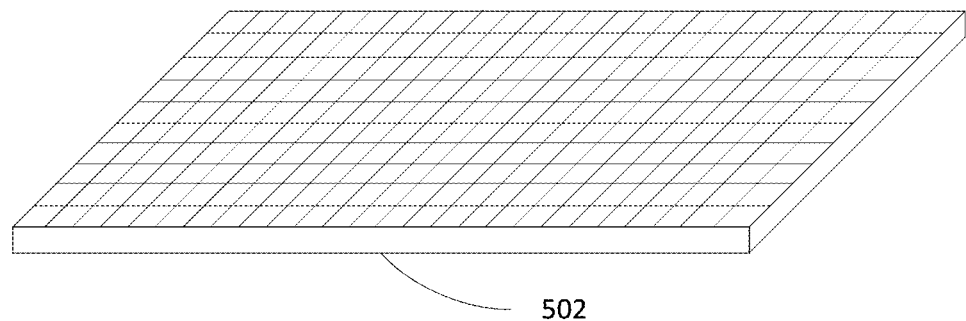

FIGS. 5A and 5B show illustrative diagrams of displays comprising multiple portions, in accordance with embodiments of the disclosure. FIG. 5A shows a first display 500 and FIG. 5B shows a second display 502. In some embodiments, the displays are used to display 3D content. For example, the first display 500 may be part of a head-mounted device used for displaying 3D content. In another example, the second display 502 may be a display used by a television, laptop, smartphone, and/or similar such device to display 3D content. In some embodiments, the displays comprise a plurality of microdisplays. For example, the first display 500 may comprise 12 microdisplays and the second display 502 may comprise over 200 microdisplays. In some embodiments, the displays comprise portions that are not connected to each other. For example, the first display 500 may comprise 12 microdisplays, where each microdisplay may change positions independent of each other (e.g., microdisplays 104*a*-104*d* shown in FIG. 1A). In some embodiments, the displays comprise portions that are not connected to each other. For example, the second display 502 may be one continuous flexible display.

In some embodiments, the displays are associated with a single lens. For example, the first display 500 may only be visible through a single lens (e.g., first lens 102*a* shown in FIG. 1A). In some embodiments, the displays are visible from two lenses. For example, the second display 502 may be visible through two lenses (e.g., first lens 102*a* and second lens 102*b* shown in FIG. 1A).

In some embodiments, the displays and/or the portions of the displays have rectangular cross-sections. Although rectangular cross-sections are shown, other shapes of displays and/or portions of displays may be used. For example, the displays and/or the portions of the displays may have circular cross-sections, triangular cross-sections, hexagonal cross-sections, and/or similar such cross-sections. In some embodiments, the displays and/or the portions of the displays have the same or similar size and/or shaped cross-sections. In some embodiments, the shape and/or size of the cross-sections of the displays and/or the portions of the displays vary. For example, the first display 500 may comprise four microdisplays with a triangular cross-section, four microdisplays with a circular cross-section, four microdisplays with a rectangular cross-section of a first size, and a four microdisplays with a rectangular cross-section of a second size. In some embodiments, the displays are attached to a housing using one or more members. For example, the first display 500 may be attached to a housing using one or more telescopic support rods.

Figure 6A:
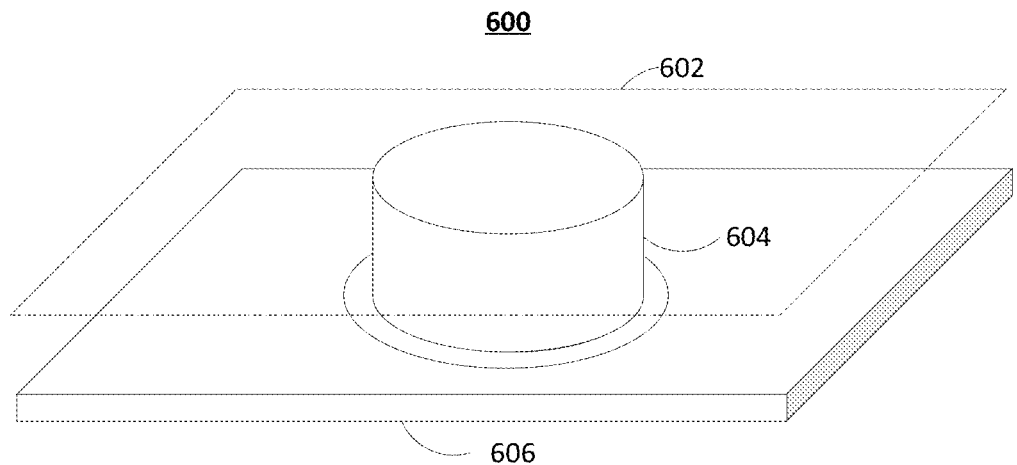
FIGS. 6A and 6B show illustrative diagrams of a mechanism for manipulating a display so that portions of the display are located at varying planes, in accordance with embodiments of the disclosure.
Figure 6B:
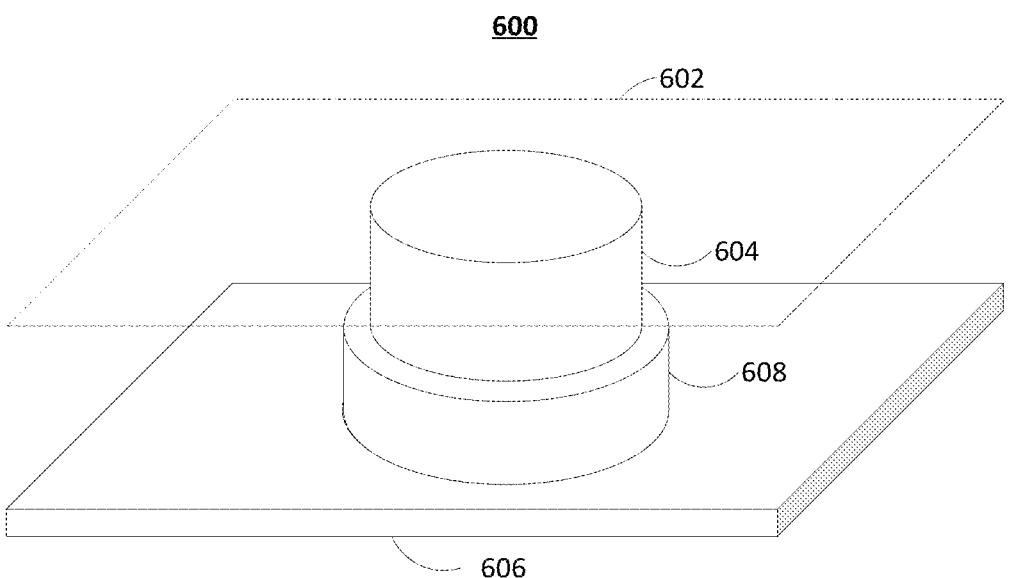

FIGS. 6A and 6B show illustrative diagrams of a system 600 for manipulating a display so that portions of the display are located at varying planes, in accordance with embodiments of the disclosure. In some embodiments, a microdisplay 602 is coupled to a platform 606. Although only one microdisplay is shown, any number of microdisplays may be coupled to the platform 606 and/or use a mechanism similar to what is displayed in FIGS. 6A and 6B. In some embodiments, the microdisplay 602 is a portion of a microdisplay (e.g., third portion 210*c* of the first microdisplay 204*a* in FIG. 2B).

FIG. 6A displays the microdisplay 602 in a first position. FIG. 6B displays the microdisplay 602 in a second position.

In some embodiments, the microdisplay 602 is coupled to a first member 604. In some embodiments, the first member 604 extends the microdisplay 602 away from the platform 606. For example, the first member 604 may extend in the direction shown in FIGS. 6A and 6B. In some embodiments, the first member 604 retracts, bringing the microdisplay 602 toward the platform 606. In some embodiments, the system 600 utilizes a MEMS to change the microdisplay 602 from the first portion to the second position. In some embodiments, the system 600 manipulates fluid within the first member 604 and/or the second member 608 to change the position of the microdisplay 602.

FIG. 6B displays the microdisplay 602 in a second position. In some embodiments, the microdisplay 602 is coupled to the first member 604 and the second member 608. In some embodiments, the second member 608 extends the microdisplay 602 away from the platform 606. In some embodiments, the first member 604 and/or second member 608 change the position of the microdisplay 602 based on a piece of 3D content. For example, a device may determine that a first object within the piece of 3D content is located on a first plane. The device may then determine one or more locations for the microdisplay 602 according to the plane associated with the first object. For example, the device may calculate the second position for the microdisplay 602 to display the first object based on a focal length of a lens (e.g., first lens 102*a*) and the first object being located on the first plane within the piece of 3D content. The device may then use the first member 604 and the second member 608 to change the position of the microdisplay 602 from the first position (e.g., as shown FIG. 6A) to a second position (e.g., as shown in FIG. 6B). In some embodiments, the microdisplay 602 at the second position displays the first object of the piece of 3D content.

FIGS. 7A-7D show other illustrative diagrams of a system 700 for manipulating a display so that portions of the display are located at varying planes, in accordance with embodiments of the disclosure. In some embodiments, a microdisplay 702 is attached to a member 704 and the member 704 is attached to a platform 706. Although only one microdisplay 702 and one member 704 are shown, any number of microdisplays may be coupled to the platform 706 using any number of members. In some embodiments, the microdisplay 702 is a portion of a microdisplay (e.g., the third portion 210*c* of the first microdisplay 204*a* in FIG. 2B).

Figure 7A:
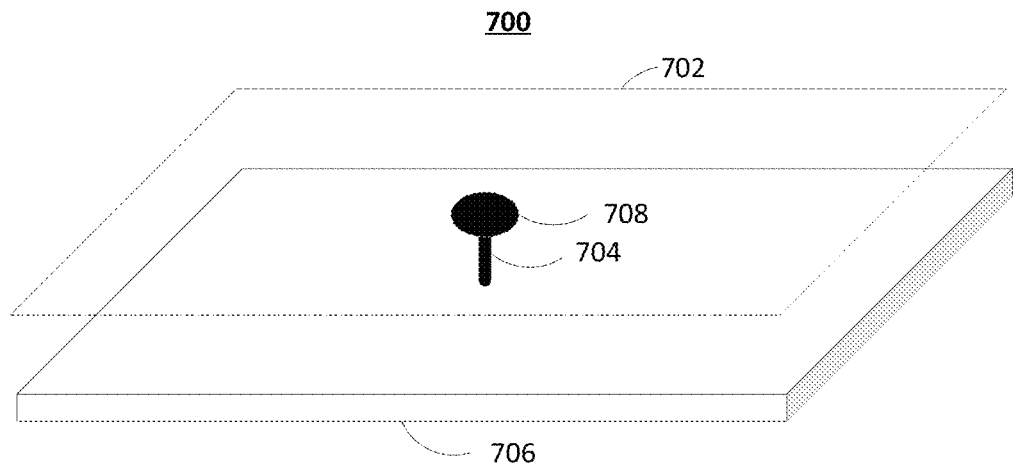
FIGS. 7A-7D show illustrative diagrams of another mechanism for manipulating a display so that portions of the display are located at varying planes, in accordance with embodiments of the disclosure.
Figure 7B:
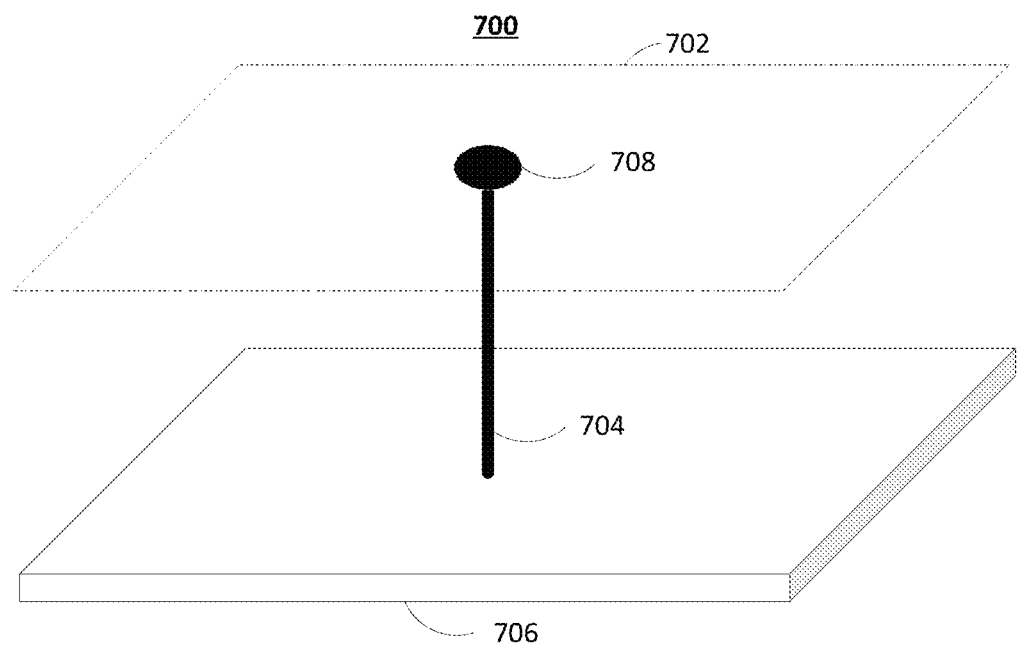

FIG. 7A displays the microdisplay 702 in a first position. FIG. 7B displays the microdisplay 702 in a second position. In some embodiments, the member 704 extends the microdisplay 702 away from the platform 706. For example, the member 704 may extend in the direction shown in FIGS. 7A and 7B. In some embodiments, the member 704 retracts, bringing the microdisplay 702 toward the platform 706. In some embodiments, the system 700 utilizes a MEMS to change the microdisplay 702 from the first position to the second position. For example, the member 704 may be a telescopic support rod. In some embodiments, the system 700 manipulates fluid within the member 704 to change the position of the microdisplay 702.

Figure 7C:
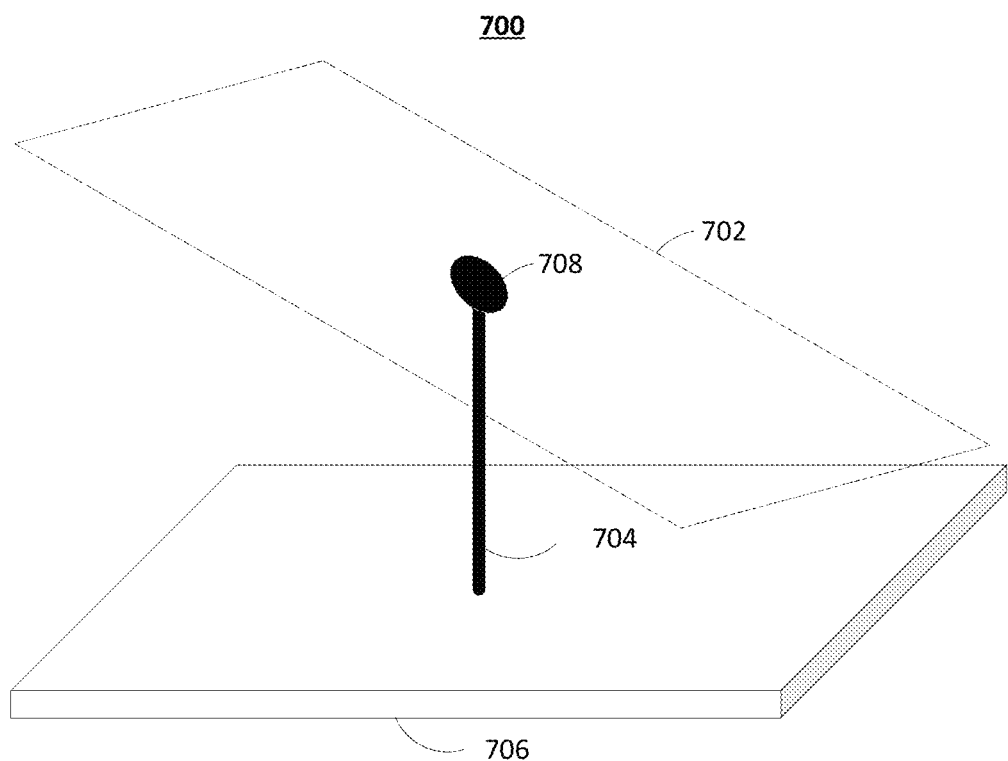

In some embodiments, the system 700 uses a portion 708 of the member 704 to change the position of the microdisplay 702. For example, the portion 708 of the member 704 may be used to tilt, rotate, extend, and/or retract the microdisplay 702 in relation to the member 704. FIG. 7C displays the system 700 using the portion 708 of the member 704 to change the microdisplay 702 from the second position (shown in FIG. 7B) to a third position. In some embodiments, the system 700 changes the microdisplay 702 to the third position by tilting and rotating the microdisplay 702. In some embodiments, tilting and/or rotating the microdisplay 702 using the portion 708 of the member 704 provides improved display of the piece of 3D content. For example, tilting and/or rotating the microdisplay 702 using the portion 708 of the member 704 may reduce or eliminate holes between two or more microdisplays.

Figure 7D:
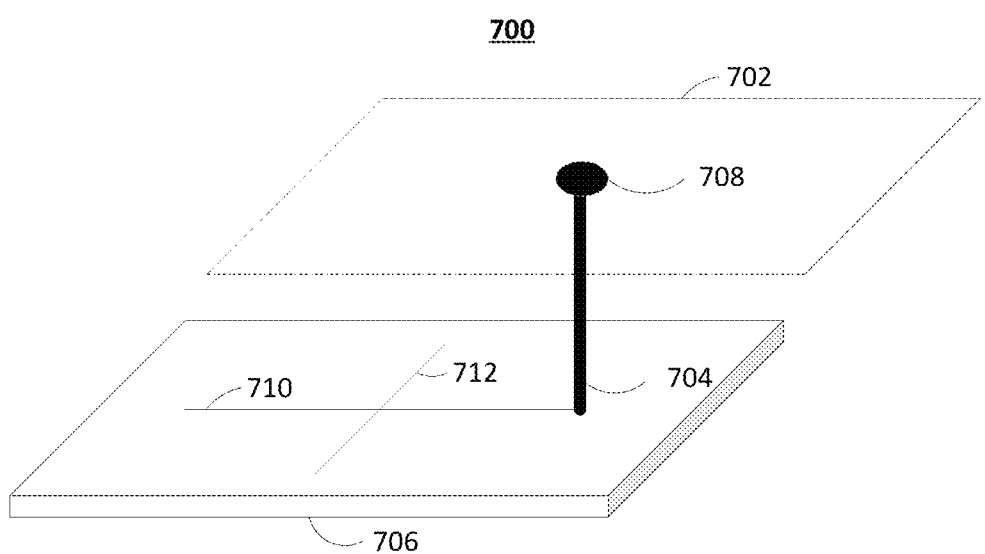

FIG. 7D displays the microdisplay 702 in a fourth position. In some embodiments, the system 700 comprises a first track 710 and a second track 712. Although only two tracks are shown, any number of tracks and/or any shape of tracks may be user. For example, there may be one or more circular tracks, one or more rectangular tracks, etc. In some embodiments, the system 700 slides the member 704 in a first direction along the first track 710 to change the microdisplay 702 from the second position (shown in FIG. 7B) to the fourth position (shown in FIG. 7D). In some embodiments, sliding the microdisplay 702 along one or more tracks improves the display of the piece 3D content. For example, sliding the microdisplay 702 along one or more tracks may reduce or eliminate holes between two or more microdisplays. In some embodiments, a device (e.g., device 100, device 200, user equipment device 1100, etc.) uses one or more of the techniques and/or technologies described herein to change the position of a portion of a microdisplay.

Figure 8A:
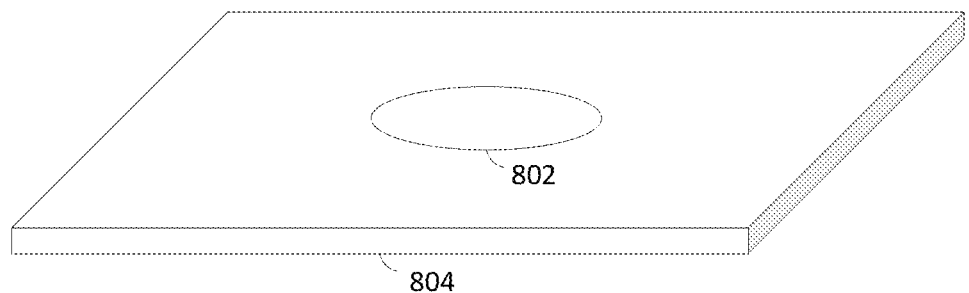
FIGS. 8A and 8B show illustrative diagrams of a lens used with a device for manipulating a stereoscopic display so that portions of the stereoscopic display are located at varying planes, in accordance with embodiments of the disclosure.
Figure 8B:
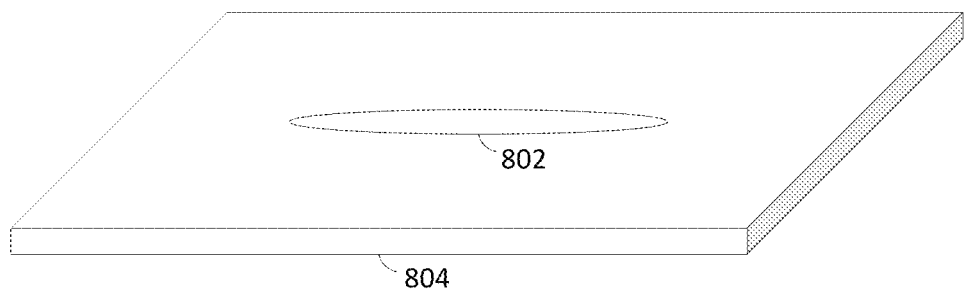

FIGS. 8A and 8B shows illustrative diagrams of a lens 802 used with a device for manipulating a stereoscopic display so that portions of the stereoscopic display are located at varying planes, in accordance with embodiments of the disclosure. In some embodiments, a lens 802 is coupled to a platform 804. Although one lens is shown, any number of lenses may be coupled to the platform 804 and/or use the mechanism displayed in FIGS. 8A and 8B. For example, a first lens (e.g., first lens 102a shown in FIG. 1A) and a second lens (e.g., second lens 102b shown in FIG. 1A) may both use one or more mechanisms or techniques described herein.

FIG. 8A displays the lens 802 in a first shape. FIG. 8B displays the lens 802 in a second shape. In some embodiments, a device changes the shape of the lens 802 using a MEMS component, a micro-piezoelectric component, and/or other electro-mechanical controllers. For example, the lens 802 may be coupled to one or more members. The one or more members may expand or contract the lens 802 in one or more directions. In some embodiments, the device may change the position of the lens 802. For example, the device may extend the lens 802 away from the platform 804 using one or more members. In another example, the device may tilt the lens 802. In another example, the device may change the positions of the lens 802 from a first depth within the platform 804 to a second depth within the platform 804.

Figure 9A:
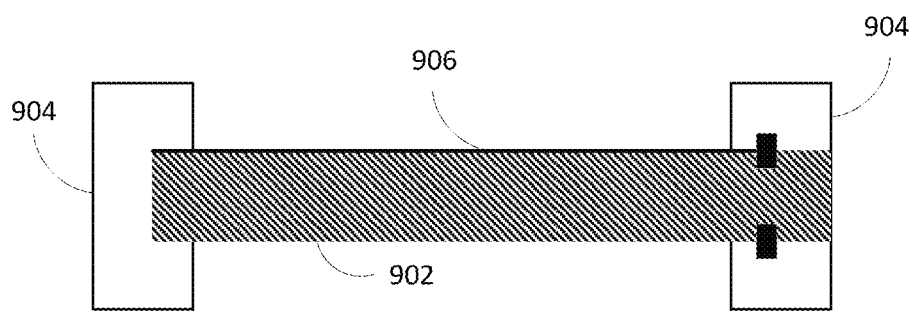
FIGS. 9A and 9B show illustrative diagrams of another lens used with a device for manipulating a stereoscopic display so that portions of the stereoscopic display are located at varying planes, in accordance with embodiments of the disclosure.
Figure 9B:
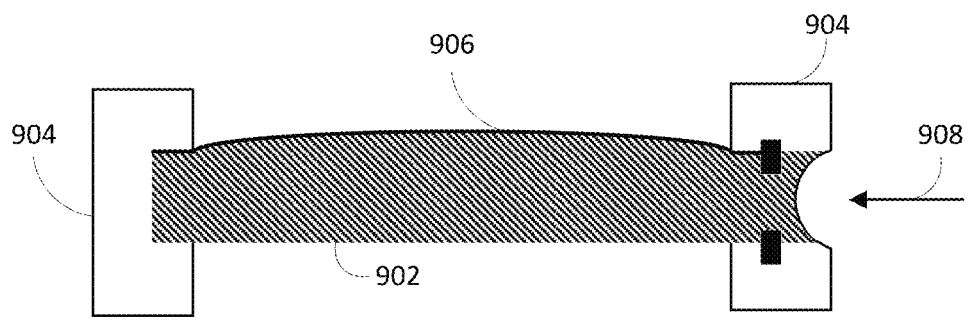

FIGS. 9A and 9B show other illustrative diagrams of a lens 902 used with a device for manipulating a stereoscopic display so that portions of the stereoscopic display are located at varying planes, in accordance with embodiments of the disclosure. In some embodiments, the lens 902 is a liquid lens and has a top surface 906. In some embodiments, the top surface 906 is liquid or a film. The lens 902 may be coupled to a platform 904. Although one lens is shown, any number of lenses may be coupled to the platform 904 and/or use the mechanisms displayed in FIGS. 9A and 9B. For example, a first lens (e.g., first lens 102a shown in FIG. 1A) and a second lens (e.g., second lens 102b shown in FIG. 1A) may both use one or more mechanisms or techniques described herein.

FIG. 9A displays the lens 902 in a first shape. FIG. 9B displays the lens 904 in a second shape. In some embodiments, a device changes the lens 902 from the first shape to the second shape by applying a force 908 to the lens 902. For example, the device may constrict the lens 902 so that the top surface 906 becomes more convex. In some embodiments, the device changes the shape of the lens 902 using electrowetting, shape-changing polymers, acusto-optical tuning, and/or similar such methodologies.

In some embodiments, the device (e.g., device 100, device 200, user equipment device 1100, etc.) changes the focal length of the lens 902 to reduce the speed at which the device would have to move one or more microdisplays to display an object changing distances relative to a first viewpoint of a piece of 3D content. For example, if the speed at which the device would have to move one or more microdisplays is above a threshold speed, the device may change the lens 902 from the first shape (e.g., as shown in FIG. 9A) to the second shape (e.g., as shown in FIG. 9A). In another example, if the speed at which the device would have to move one or more microdisplays is above a threshold speed, the device may change the lens 902 from a first position (e.g., first depth within the platform 904) to a second position (e.g., second depth within the platform 904).

Figure 10:
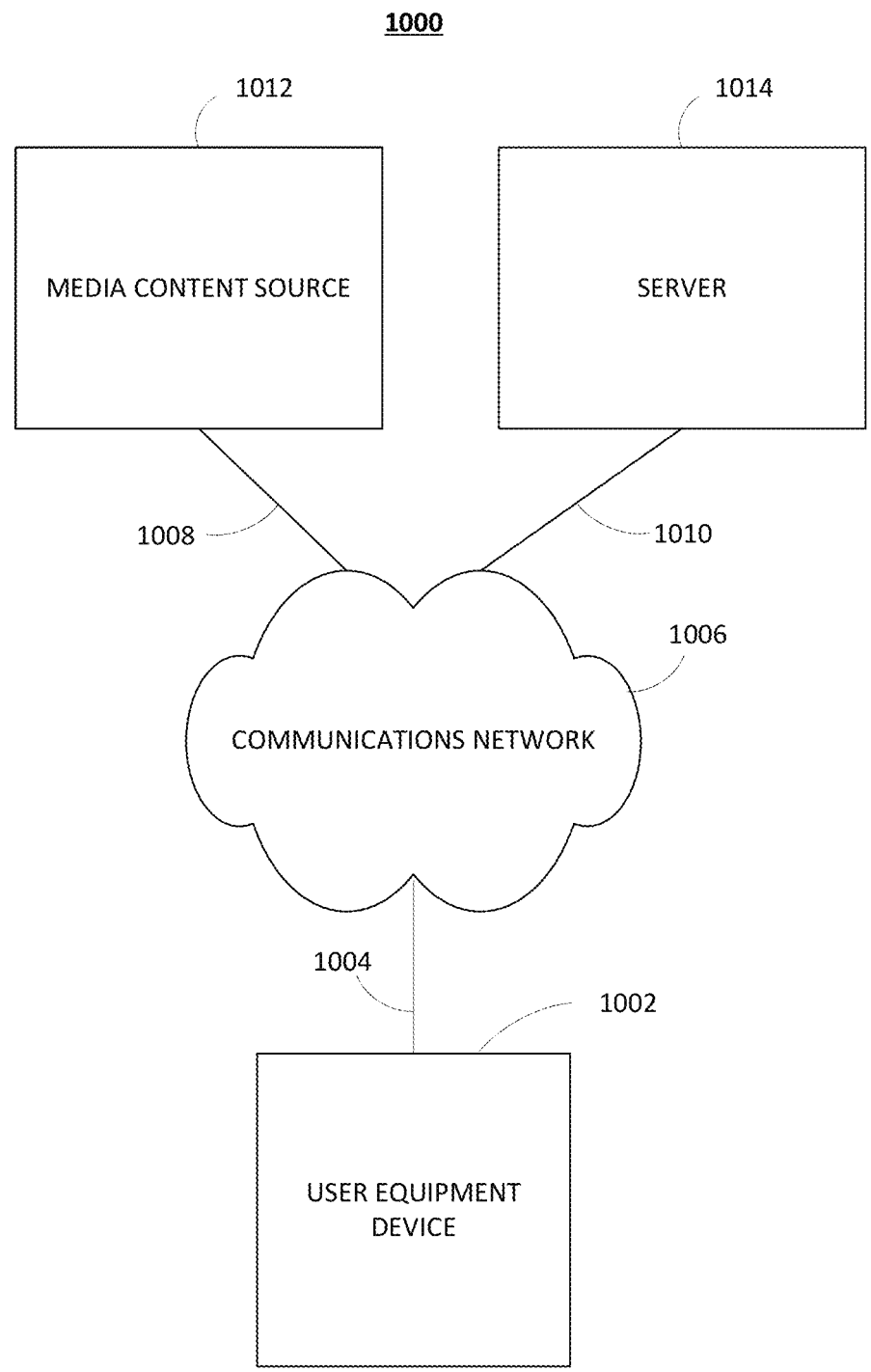
FIG. 10 shows an illustrative block diagram of a media system, in accordance with embodiments of the disclosure.
Figure 11:
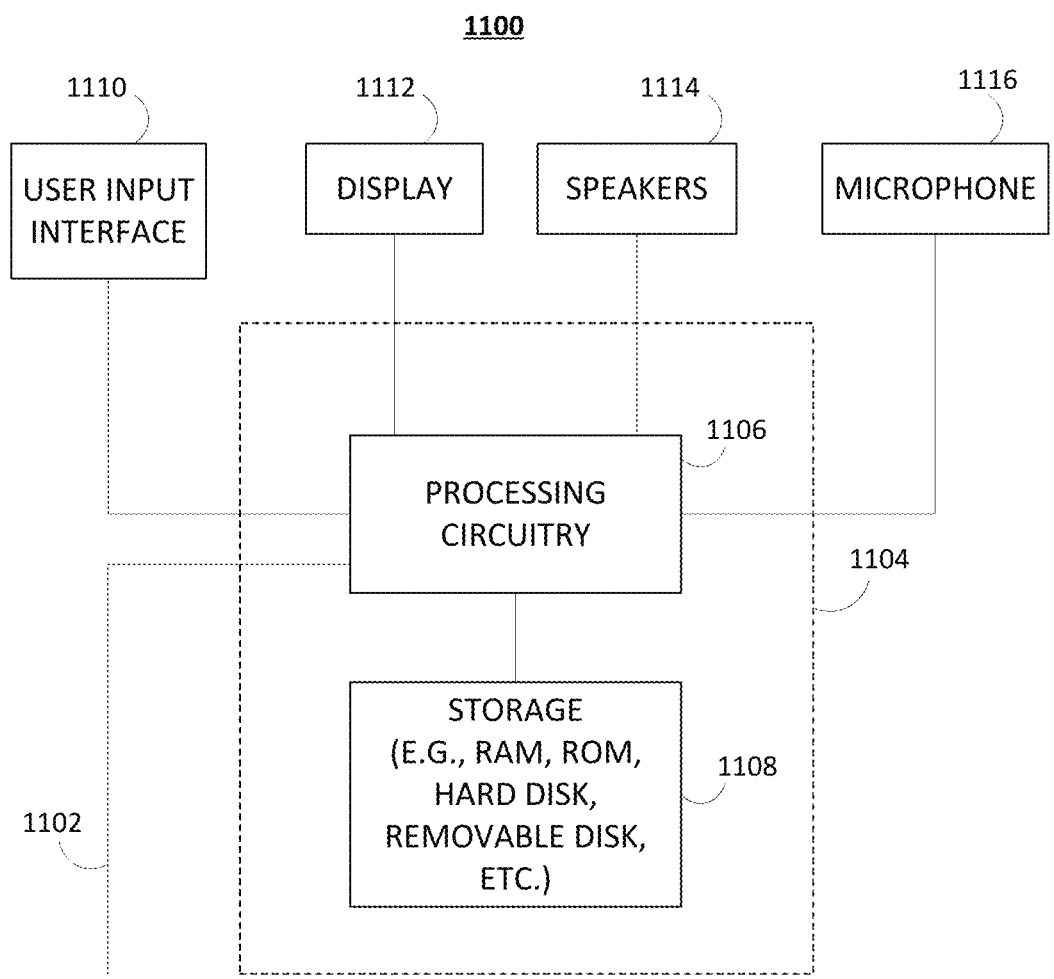
FIG. 11 shows an illustrative block diagram of a user equipment device system, in accordance with some embodiments of the disclosure.

FIGS. 10-11 describe exemplary devices, systems, servers, and related hardware for manipulating a display (e.g., stereoscopic display) so that portions of the display are located at varying planes, in accordance with some embodiments. In the system 1000, there can be more than one user equipment device 1002 but only one is shown in FIG. 10 to avoid overcomplicating the drawing. In addition, a user may utilize more than one type of user equipment device 1002 and more than one of each type of user equipment device. As described above, the user equipment device 1002 may be an XR device (e.g., head-mounted display) and/or an audio output device. In some embodiments, the user equipment device 1002 may be a television, smartphone, laptop, desktop, tablet, and/or any other type of computer able to display content. In an embodiment there may be paths between user equipment devices, so that the devices may communicate directly with each other via communications paths, as well as other short-range point-to-point communications paths, such as USB cables, IEEE 1394 cables, wireless paths (e.g., Bluetooth, infrared, IEEE 802-11x, etc.), or other short-range communication via wired or wireless paths. In an embodiment, the user equipment devices may also communicate with each other directly through an indirect path via the communications network 1006.

The user equipment devices may be coupled to communications network 1006. Namely, the user equipment device 1002 is coupled to the communications network 1006 via communications path 1004. A media content source 1012 is coupled to the communications network 1006 via communications path 1008 and a server 1014 is coupled to the communications network 1006 via communication path 1010. The communications network 1006 may be one or more networks including the Internet, a mobile phone network, mobile voice or data network (e.g., a 4G, 5G, or LTE network), cable network, public switched telephone network, or other types of communications network or combinations of communications networks. The paths (e.g., path 1004, path 1008, path 1010) may separately or in together with other paths include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. In one embodiment one or more paths can be a wireless path. Communication with the user equipment device may be provided by one or more communications paths but is shown as a single path in FIG. 10 to avoid overcomplicating the drawing.

The system 1000 also includes media content source 1012, and server 1014, which can be coupled to any number of databases providing information to the user equipment devices. For example, media content source 1012 and server 1014 may have access to stereoscopic data, augmentation data, 2D and/or 3D mapping data, and/or similar such information. The media content source 1012 represents any computer-accessible source of content, such as a storage for audio content, metadata, or, similar such information. The server 1014 may store and execute various software modules for manipulating a display so that portions of the display are located at varying planes functionality. In some embodiments, the user equipment device 1002, media content source 1012, and server 1014 may store metadata associated with media content. In some embodiments, media content, content item, piece of media, piece of 3D content, may be used interchangeably.

FIG. 11 shows a generalized embodiment of a user equipment device 1100, in accordance with one embodiment. In an embodiment, the user equipment device 1100, is an example of the user equipment devices described in FIGS. 1-10 (e.g., device 102). The user equipment device 1100 may receive content and data via input/output (I/O) path 1102. The I/O path 1102 may provide audio content (e.g., broadcast programming, on-demand programming, Internet content, content available over a local area network (LAN) or wide area network (WAN), and/or other content) and data to control circuitry 1104, which includes processing circuitry 1106 and a storage 1108. The control circuitry 1104 may be used to send and receive commands, requests, and other suitable data using the I/O path 1102. The I/O path 1102 may connect the control circuitry 1104 (and specifically the processing circuitry 1106) to one or more communications paths. I/O functions may be provided by one or more of these communications paths but are shown as a single path in FIG. 11 to avoid overcomplicating the drawing.

The control circuitry 1104 may be based on any suitable processing circuitry such as the processing circuitry 1106. As referred to herein, processing circuitry should be understood to mean circuitry based on one or more microprocessors, microcontrollers, digital signal processors, programmable logic devices, field-programmable gate arrays ("FPGAs"), application-specific integrated circuits ("ASICs"), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). The manipulating a display so that portions of the display are located at varying planes functionality can be at least partially implemented using the control circuitry 1104. The manipulating a display so that portions of the display are located at varying planes functionality described herein may be implemented in or supported by any suitable software, hardware, or combination thereof. The providing of stereoscopic data, augmentation data, 2D data, and/or 3D data can be implemented on user equipment, on remote servers, or across both.

In client-server-based embodiments, the control circuitry 1104 may include communications circuitry suitable for communicating with one or more servers that may at least implement the described manipulating of a display so that portions of the display are located at varying planes functionality. The instructions for carrying out the above-mentioned functionality may be stored on the one or more servers. Communications circuitry may include a cable modem, an integrated service digital network ("ISDN") modem, a digital subscriber line ("DSL") modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as the storage 1108 that is part of the control circuitry 1104. As referred to herein, the phrase "electronic storage device" or "storage device" should be understood to mean any device for storing electronic data, computer software, or firmware, such as random-access memory, read-only memory, hard drives, optical drives, digital video disc ("DVD") recorders, compact disc ("CD") recorders, BLU-RAY disc ("BD") recorders, BLU-RAY 3D disc recorders, digital video recorders ("DVR", sometimes called a personal video recorder, or "PVR"), solid-state devices, quantum storage devices, gaming consoles, gaming media, or any other suitable fixed or removable storage devices, and/or any combination of the same. The storage 1108 may be used to store various types of content described herein. Nonvolatile memory may also be used (e.g., to launch a boot-up routine and other instructions). Cloud-based storage, described in relation to FIG. 10, may be used to supplement the storage 1108 or instead of the storage 1108.

The control circuitry 1104 may include audio generating circuitry and tuning circuitry, such as one or more analog tuners, audio generation circuitry, filters or any other suitable tuning or audio circuits or combinations of such circuits. The control circuitry 1104 may also include scaler circuitry for upconverting and down converting content into the preferred output format of the user equipment device 1100. The control circuitry 1104 may also include digital-to-analog converter circuitry and analog-to-digital converter circuitry for converting between digital and analog signals. The tuning and encoding circuitry may be used by the user equipment device 1100 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 1108 is provided as a separate device from the user equipment device 1100, the tuning and encoding circuitry (including multiple tuners) may be associated with the storage 1108.

The user may utter instructions to the control circuitry 1104, which are received by the microphone 1116. The microphone 1116 may be any microphone (or microphones) capable of detecting human speech. The microphone 1116 is connected to the processing circuitry 1106 to transmit detected voice commands and other speech thereto for processing. In some embodiments, voice assistants (e.g., Siri, Alexa, Google Home and similar such voice assistants) receive and process the voice commands and other speech.

The user equipment device 1100 may optionally include an interface 1110. The interface 1110 may be any suitable user interface, such as a remote control, mouse, trackball, keypad, keyboard, touch screen, touchpad, stylus input, joystick, or other user input interfaces. A display 1112 may be provided as a stand-alone device or integrated with other elements of the user equipment device 1100. For example, the display 1112 may be a touchscreen or touch-sensitive display. In such circumstances, the interface 1110 may be integrated with or combined with the microphone 1116. When the interface 1110 is configured with a screen, such a screen may be one or more of a monitor, a television, a liquid crystal display ("LCD"), active matrix display, cathode ray tube display, light-emitting diode display, organic light-emitting diode display, quantum dot display, or any other suitable equipment for displaying visual images. In some embodiments, the interface 1110 may be HDTV-capable. The display 1112 may have one or more portions that can be adjusted to varying planes. For example, the control circuitry 1104 may utilize a MEMS to adjust a first portion of the display 1112 to a first plane. A speaker 1114 may be controlled by the control circuitry 1104. The speaker (or speakers) 1114 may be provided as integrated with other elements of user equipment device 1100 or may be a stand-alone unit. In some embodiments, the display 1112 may be outputted through speaker 1114.

The user equipment device 1100 of FIG. 11 can be implemented in system 1000 of FIG. 10 as user equipment device 1002, but any other type of user equipment suitable for manipulating a display so that portions of the display are located at varying planes may be used. For example, user equipment devices such as television equipment, computer equipment, wireless user communication devices, or similar such devices may be used. User equipment devices may be part of a network of devices.

Figure 12:
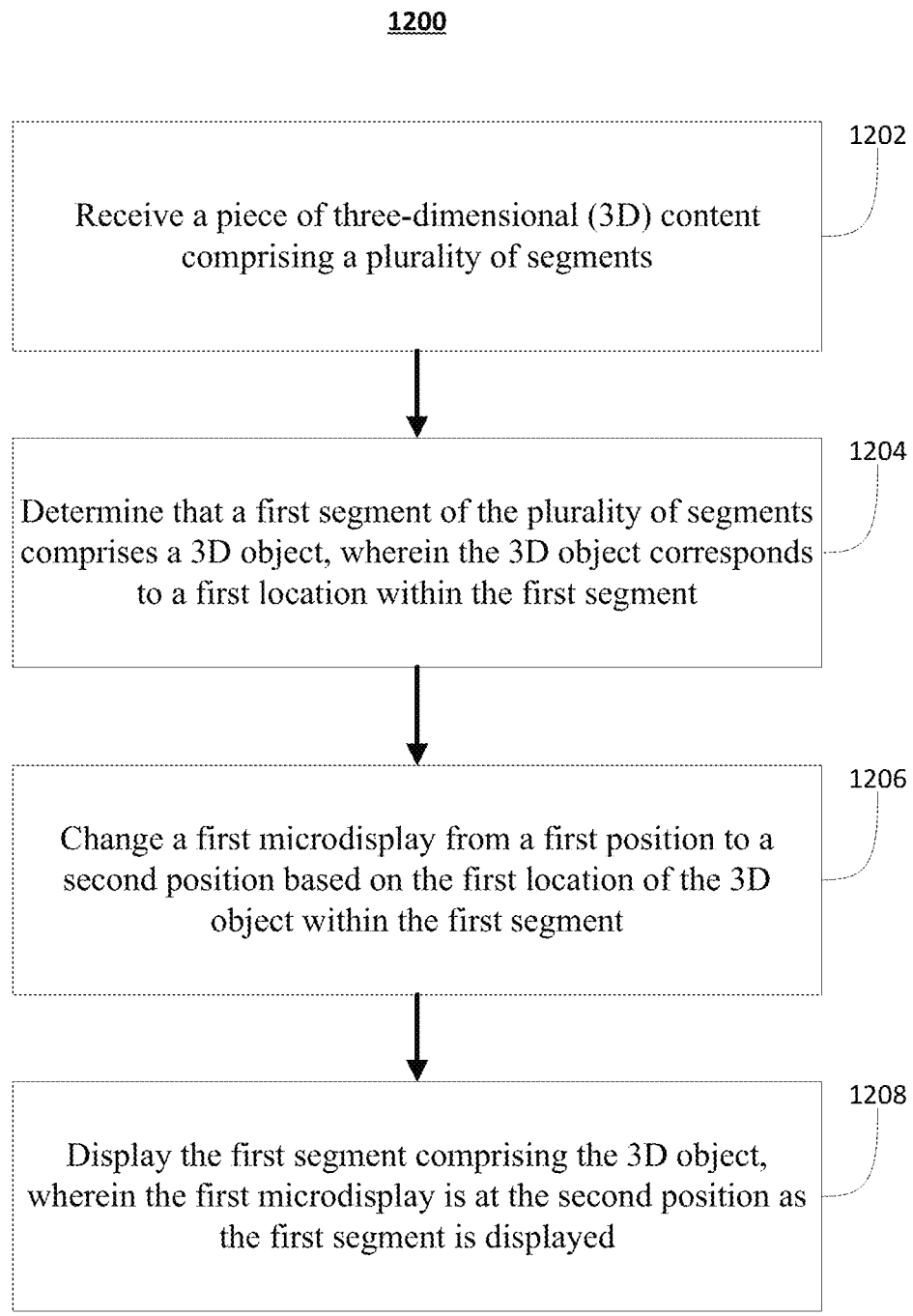
FIG. 12 is an illustrative flowchart of a process for manipulating a display so that portions of the display are located at varying planes, in accordance with embodiments of the disclosure.

FIG. 12 is an illustrative flowchart of a process 1200 for manipulating a display so that portions of the display are located at varying planes in accordance with embodiments of the disclosure. Process 1200, and any of the following processes, may be executed by control circuitry 1104 on a user equipment device 1100. In some embodiments, control circuitry 1104 may be part of a remote server separated from the user equipment device 1100 by way of a communications network or distributed over a combination of both. In some embodiments, the control circuitry is at a local server and/or within a head-mounted display device. In some embodiments, instructions for executing process 1200 may be encoded onto a non-transitory storage medium (e.g., the storage 1108) as a set of instructions to be decoded and executed by processing circuitry (e.g., the processing circuitry 1106). Processing circuitry may, in turn, provide instructions to other sub-circuits contained within control circuitry 1104, such as the encoding, decoding, encrypting, decrypting, scaling, analog/digital conversion circuitry, and the like. It should be noted that the process 1200, or any step thereof, could be performed on, or provided by, any of the devices shown in FIGS. 1A-11. Although the process 1200, and any of the following processes, are illustrated and described as a sequence of steps, it is contemplated that various embodiments of processes may be performed in any order or combination and need not include all the illustrated steps.

At 1202, control circuitry receives a piece of 3D content comprising a plurality of segments. In some embodiments, the piece of 3D content is an image or plurality of images corresponding to a movie, television show, video game, and/or any other type of 3D content. In some embodiments, the control circuitry receives the piece of 3D content from a server.

At 1204, control circuitry determines that a first segment of the plurality of segments comprises a 3D object, wherein the 3D object corresponds to a first location within the first segment. For example, the first segment of the piece of 3D content may depict a landscape, where the 3D object (e.g., cloud) is located at first location. In some embodiments, the control circuitry determines that the first segment of the piece of 3D content comprises the 3D object using metadata associated with the piece of 3D content. For example, the control circuitry may receive metadata associated with the piece of 3D content, wherein the metadata indicates that the 3D content comprises 3D objects. In some embodiments, the control circuitry may receive the metadata when the control circuitry receives the piece of 3D content at step 1202. The metadata may also provide information about the 3D objects displayed in the piece of 3D content. For example, the metadata may indicate location information relating to the 3D objects displayed in the piece of 3D content. The location information may comprise coordinates related to the 3D objects displayed in the piece of 3D content, indicators specifying plane information related to the 3D objects displayed in the piece of 3D content, and/or similar such information. In some embodiments, the piece of 3D content comprises the metadata.

In some embodiments, certain 3D objects receive a preference for determining the positions of one or more microdisplays. For example, a segment may depict a person (e.g., first 3D object) standing in front of a tree (e.g., second 3D object). In such an example, the control circuitry may determine that the first 3D object is more prominent in the segment than the second 3D object and assign the first 3D object a first ranking and the second 3D object a second ranking that is less than the first ranking. In some embodiments, the control circuitry uses eye tracking to determine that the first 3D object is more prominent than the second 3D object. For example, the control circuitry may determine that the first 3D object should have a higher ranking if the user's eyes spend more time looking at the first 3D object than the second 3D object. In some embodiments the control circuitry uses metadata to determine that the first 3D object is more prominent than the second 3D object. For example, metadata associated with the piece of 3D content may indicate that the first 3D object has a higher ranking than the second 3D object. The control circuitry may determine that the first object and the second object are both going to be displayed by the same microdisplay (e.g., first microdisplay) but are located at different depths within the segment. For example, the first segment may depict the first object as being 1 meter from the viewpoint of the segment and may depict the second object as being 20 meters from the viewpoint of the segment. In such an example, the control circuitry may determine the position of the first microdisplay according to the location (e.g., 1 meter from the viewpoint of the segment) of the first object within the segment because the first object has a higher ranking than the second object.

At 1206, control circuitry changes a first microdisplay from a first position to a second position based on the first location of the 3D object within the first segment. In some embodiments, the control circuitry calculates the second position for the first microdisplay using the focal length of a lens (e.g., the first lens 102a shown in FIG. 1A) and the first location of the 3D object within the piece of 3D content. For example, the control circuitry may use one or more equations (e.g., Equation 2) described above to determine a position for the first microdisplay relative to the lens. In some embodiments, the control circuitry changes the position of the first microdisplay using one or more members. For example, one or more members coupled to the first microdisplay may be telescopic support rods that can change the position of the first microdisplay. In another example, the one or more members may be fluid chambers that can change the position of the first microdisplay. In some embodiments, the control circuitry utilizes a MEMS comprising one or more members to change the first microdisplay from the first position to the second position.

At 1208, control circuitry displays the first segment comprising the 3D object, wherein the first microdisplay is at the second position as the first segment is displayed. In some embodiments, the control circuitry displays the first segment using a plurality of microdisplays. In some embodiments, the second position of the first microdisplay is on a different plane relative to at least one microdisplay of the plurality of microdisplays. For example, the first microdisplay may be a first vertical distance from a lens and a second microdisplay may be a second vertical distance from the lens. In some embodiments, the control circuitry displaying the 3D object on the first microdisplay at the second position provides depth and reduces or eliminates the vergence-accommodation conflict.

Figure 13:
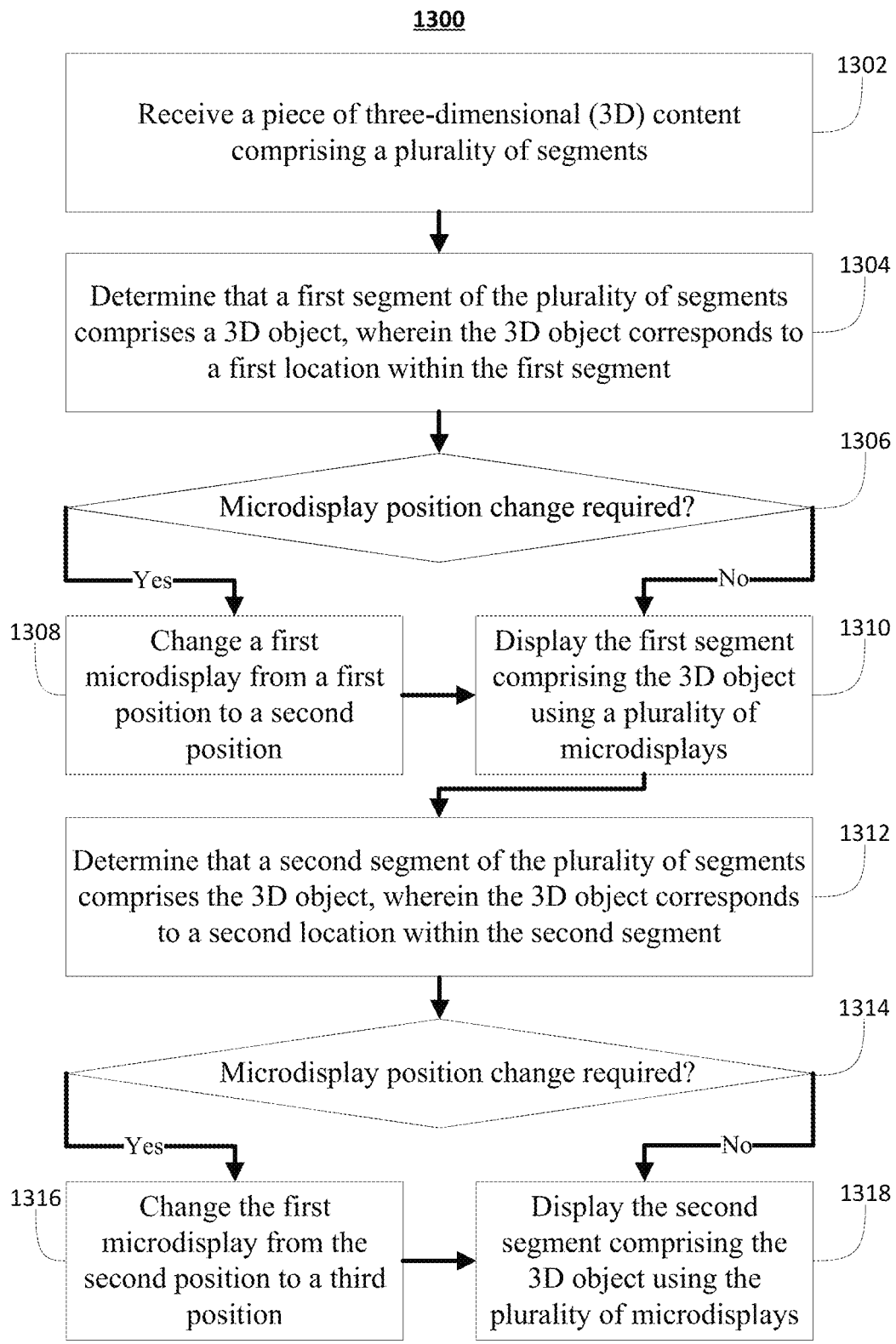
FIG. 13 is another illustrative flowchart of a process for manipulating a display so that portions of the display are located at varying planes, in accordance with embodiments of the disclosure.

FIG. 13 is another illustrative flowchart of a process 1300 for manipulating a display so that portions of the display are located at varying planes in accordance with embodiments of the disclosure.

At 1302, control circuitry receives a piece of 3D content comprising a plurality of segments. In some embodiments, the control circuitry uses the same or similar methodologies described above at step 1202 to receive the piece of 3D content comprising the plurality of segments.

At 1304, control circuitry determines that a first segment of the plurality of segments comprises a 3D object, wherein the 3D object corresponds to a first location within the first segment. In some embodiments, the control circuitry uses the same or similar methodologies described above at step 1204 to determine that the first segment of the plurality of segments comprises the 3D object, wherein the 3D object corresponds to the first location within the first segment.

At 1306, control circuitry determines whether a microdisplay position change is required. In some embodiments, the control circuitry identifies that one or more microdisplays of a plurality of microdisplays are associated with the 3D object. For example, the control circuitry may display the first segment of the piece of 3D content using 5 microdisplays, and a first microdisplay of the plurality of microdisplays may display the 3D object that is included in the first segment. Accordingly, the first microdisplay may be associated with the 3D object. In another example, the control circuitry may display the first segment of the piece of 3D content using 5 microdisplays, a first microdisplay may display a first portion of the 3D object in the first segment, and a second microdisplay may display a second portion of the 3D object in the first segment. Accordingly, the first microdisplay and the second microdisplay may be associated with the 3D object. In some embodiments, the control circuitry determines one or more positions for the one or more microdisplays associated with the 3D object to display the 3D object. For example, the control circuitry may determine that the first microdisplay is associated with the 3D object. The control circuitry may use a focal length of a lens (e.g., the first lens 102a shown in FIG. 1A) and the first location of the 3D object determined at step 1304 to determine the position of the first microdisplay. In another example, the control circuitry may determine that the first microdisplay and the second microdisplay are both associated with the 3D object. The control circuitry may use the focal length of the lens and the first location of the 3D object determined at step 1304 to determine the positions of the first microdisplay and the second microdisplay.

In some embodiments, the control circuitry compares the starting positions of the one or more microdisplays associated with the 3D content to corresponding calculated positions of the one or more microdisplay associated with the 3D content. For example, a starting position of the first microdisplay may be compared with the calculated position for the first microdisplay, and a starting position of the second microdisplay may be compared with the calculated position for the second microdisplay. If the control circuitry determines that one or more starting positions are different than the corresponding one or more calculated positions, then the control circuitry my determine that a microdisplay position change is required. If the control circuitry determines that a microdisplay position change is required, then the process 1300 continues to step 1308. If the control circuitry determines that the microdisplay position change is not required, then the process 1300 continues to step 1310.

At 1308, control circuitry changes a first microdisplay from a first position to a second position. In some embodiments, the second position is the position calculated at step 1306. For example, the control circuitry may determine that the first microdisplay is associated with the 3D object. The control circuitry may use the focal length of a lens and the first location of the 3D object determined at step 1304 to determine the second position of the first microdisplay. In some embodiments, the control circuitry changes the position of the first microdisplay using one or more members. For example, one or more members coupled to the first microdisplay may be telescopic support rods that can change the position of the first microdisplay. In another example, the one or more members may be fluid chambers that can change the position of the first microdisplay. In some embodiments, the control circuitry utilizes a MEMS component comprising one or more members to change the first microdisplay from the first position to the second position.

At 1310, control circuitry displays the first segment comprising the 3D object using a plurality of microdisplays. In some embodiments, the second position of the first microdisplay is on a different plane relative to at least one microdisplay of the plurality of microdisplays. For example, the first microdisplay may be a first vertical distance from a lens and a second microdisplay may be a second vertical distance from the lens. In some embodiments, the control circuitry displaying the 3D object on the first microdisplay at the second position provides depth and reduces or eliminates the vergence-accommodation conflict.

At 1312, control circuitry determines that a second segment of the plurality of segments comprises the 3D object, wherein the 3D object corresponds to a second location within the second segment. In some embodiments, the control circuitry uses the same or similar methodologies described at step 1204 when determining that the first segment comprises the 3D object to determine that the second segment comprises the 3D object. For example, the control circuitry may receive metadata associated with the piece of 3D content, wherein the metadata indicates that the second segment of the 3D content comprises the 3D object. In some embodiments, the metadata also provides information about the 3D objects displayed in the second segment of the piece of 3D content. For example, the metadata may indicate location information relating to the 3D objects displayed in the second segment of the piece of 3D content. The location information may comprise coordinates related to the 3D objects displayed in the second segment of the piece of 3D content, indicators specifying plane information related to the 3D object displayed in the second segment of the piece of 3D content, and/or similar such information. In some embodiments, the control circuitry uses the information about the 3D object displayed in the second segment to determine the second location.

At 1314, control circuitry determines whether a microdisplay position change is required. In some embodiments, the control circuitry identifies that one or more microdisplays of a plurality of microdisplays are associated with the 3D object during the second segment. For example, the control circuitry may display the second segment of the piece of 3D content using 5 microdisplays and the first microdisplay of the plurality of microdisplays may display the 3D object during the second segment. Accordingly, the first microdisplay may be associated with the 3D object for the second segment. In another example, the control circuitry may display the second segment of the piece of 3D content using 5 microdisplays and the first microdisplay may display the first portion of the 3D object and the second microdisplay may display the second portion of the 3D object. Accordingly, the first microdisplay and the second microdisplay may be associated with the 3D object during the second segment of the piece of 3D content.

In some embodiments, the control circuitry determines one or more positions for the one or more microdisplays associated with the 3D object during the second segment. For example, the control circuitry may determine that the first microdisplay is associated with the 3D object during the second segment. The control circuitry may use a focal length of the lens (e.g., the first lens 102a shown in FIG. 1A) and the second location of the 3D object during the second segment, determined at step 1312, to determine the position of the first microdisplay during the second segment of the piece of the 3D content. In another example, the control circuitry may determine that the first microdisplay and the second microdisplay are both associated with the 3D object during the second segment. The control circuitry may use the focal length of the lens and the second location of the 3D object during the second segment, determined at step 1304, to determine the position of the first microdisplay and the second microdisplay.

In some embodiments, the control circuitry compares the positions of the one or more microdisplays associated with the 3D content during the previous segment (e.g., first segment) to corresponding calculated positions of the one or more microdisplay associated with the piece of 3D content during the second segment. For example, the position of the first microdisplay during the first segment may be compared with the calculated position for the first microdisplay during the second segment and the position of the second microdisplay during the first segment may be compared with the calculated position for the second microdisplay during the second segment. If the control circuitry determines that one or more positions of the microdisplays during the first segment are different than the corresponding one or more calculated positions during the second segment, then the control circuitry my determine that a microdisplay change is required. If the control circuitry determines that a microdisplay change is required, then the process 1300 continues to step 1316. If the control circuitry determines that the microdisplay position change is not required, then the process 1300 continues to step 1318.

At 1316, control circuitry changes the first microdisplay from the second position to a third position. In some embodiments, the third position is the position calculated at step 1314. For example, the control circuitry may determine that the first microdisplay is associated with the 3D object for the second segment. The control circuitry may use the focal length of the lens and the second location of the 3D object during the second segment, determined at step 1314, to determine the third position of the first microdisplay. In some embodiments, the control circuitry changes the position of the first microdisplay using one or more members. For example, one or more members coupled to the first microdisplay may be telescopic support rods that can change the position of the first microdisplay. In another example, the one or more members may be fluid chambers that can change the position of the first microdisplay. In some embodiments, the control circuitry utilizes a MEMS comprising one or more members to change the first microdisplay from the second position to the third position.

In some embodiments, the 3D object may change locations (e.g., from the first location to the second location) during display of the piece of 3D content. For example, the 3D object may be a first distance from a first viewpoint during the first segment of the piece of 3D content and may be a different distance from the first viewpoint during the second segment of the piece of 3D content. In some embodiments, the control circuitry uses a first speed in which the 3D object changes locations within the 3D content to calculate a second speed at which one or more microdisplays are required to move from the second position to the third position. For example, the control circuitry may use Equation 6 to determine the second speed at which to change the first microdisplay from the second position to the third position.

In some embodiments, the control circuitry also changes the focal length of the lens to reduce the speed at which the control circuitry is required to move the first microdisplay from the second position to the third position to display the 3D object changing distances relative to the first viewpoint of the piece of 3D content. In some embodiments, the control circuitry manipulates the display of the piece of 3D content at step 1318, so that the distance between the viewpoint and the 3D object in the piece of 3D content is larger. The larger distance between the viewpoint and the 3D object may reduce the speed at which the control circuitry is required to move the first microdisplay from the second position to the third position to display the 3D object changing distances relative to the first viewpoint of the piece of 3D content. In some embodiments, the control circuitry uses a combination of methodologies to reduce the speed at which the control circuitry is required to move the first microdisplay from the second position to the third position to display the 3D object changing distances relative to the first viewpoint of the piece of 3D content.

At 1318, control circuitry displays the second segment comprising the 3D object using the plurality of microdisplays. In some embodiments, the third position of the first microdisplay is on a different plane relative to at least one microdisplay of the plurality of microdisplays. For example, the first microdisplay may be a first vertical distance from a lens and a second microdisplay may be a second vertical distance from the lens. In some embodiments, the control circuitry displaying the 3D object on the first microdisplay at the third position provides depth and reduces or eliminates the vergence-accommodation conflict.

It is contemplated that some suitable steps or suitable descriptions of FIGS. 12-13 may be used with other suitable embodiments of this disclosure. In addition, some suitable steps and descriptions described in relation to FIGS. 12-13 may be implemented in alternative orders or in parallel to further the purposes of this disclosure. For example, some suitable steps may be performed in any order or in parallel or substantially simultaneously to reduce lag or increase the speed of the system or method. Some suitable steps may also be skipped or omitted from the process. Furthermore, it should be noted that some suitable devices or equipment discussed in relation to FIGS. 1A-11 could be used to perform one or more of the steps in FIGS. 12-13.

The processes discussed above are intended to be illustrative and not limiting. For instance, the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
receiving, by a device, a piece of three-dimensional (3D) content comprising a plurality of segments, wherein the device comprises a plurality of microdisplays;
determining that a first segment of the plurality of segments comprises a 3D object, wherein the 3D object corresponds to a first location within the first segment;
causing the device to change a first microdisplay of the plurality of microdisplays from a first position to a second position based on the first location of the 3D object within the first segment; and
causing the device to display the first segment comprising the 3D object using the plurality of microdisplays, wherein the first microdisplay is at the second position as the first segment is displayed.

2. The method of claim 1, wherein the first microdisplay is changed from the first position to the second position using one or more telescopic support rods attached to the first microdisplay.

3. The method of claim 1, wherein the device further comprises a first lens.

4. The method of claim 3, further comprising determining the second position of the first microdisplay based on a focal length of the first lens and the first location of the 3D object within the first segment.

5. The method of claim 3, wherein the second position of the first microdisplay is a first perpendicular distance from the first lens, a position of a second microdisplay of the plurality of microdisplays is a second perpendicular distance from the first lens, and the first perpendicular distance and the second perpendicular distance are different.

6. The method of claim 1, further comprising:
determining that a second segment of the plurality of segments comprises the 3D object, wherein the 3D object corresponds to a second location within the second segment;
causing the device to change the first microdisplay from the second position to a third position based on the second location of the 3D object within the second segment; and
causing the device to display the second segment comprising the 3D object using the plurality of microdisplays, wherein the first microdisplay is at the third position as the second segment is displayed.

7. The method of claim 6, wherein the first microdisplay is changed from the second position to the third position using one or more telescopic support rods attached to the first microdisplay.

8. The method of claim 1, further comprising identifying the first location of the 3D object within the first segment.

9. The method of claim 8, wherein the first location of the 3D object corresponds to a depth of a virtual plane in the first segment.

10. The method of claim 1, wherein a server causes the device to change the first microdisplay from the first position to the second position.

11. An apparatus, comprising:
control circuitry; and
at least one memory including computer program code for one or more programs, the at least one memory and the computer program code configured to, with the control circuitry, cause the apparatus to perform at least the following:
receive a piece of three-dimensional (3D) content comprising a plurality of segments;
determine that a first segment of the plurality of segments comprises a 3D object, wherein the 3D object corresponds to a first location within the first segment;
change a first microdisplay of a plurality of microdisplays from a first position to a second position based on the first location of the 3D object within the first segment; and
display the first segment comprising the 3D object using the plurality of microdisplays, wherein the first microdisplay is at the second position as the first segment is displayed.

12. The apparatus of claim 11, wherein the apparatus is caused to change the first microdisplay from the first position to the second position using one or more telescopic support rods attached to the first microdisplay.

13. The apparatus of claim 11, further comprising a first lens.

14. The apparatus of claim 13, wherein the apparatus is further caused to determine the second position of the first microdisplay based on a focal length of the first lens and the first location of the 3D object within the first segment.

15. The apparatus of claim 13, wherein the second position of the first microdisplay is a first perpendicular distance from the first lens, a position of a second microdisplay of the plurality of microdisplays is a second perpendicular distance from the first lens, and the first perpendicular distance and the second perpendicular distance are different.

16. The apparatus of claim 11, wherein the apparatus is further caused to:
determine that a second segment of the plurality of segments comprises the 3D object, wherein the 3D object corresponds to a second location within the second segment;
change the first microdisplay from the second position to a third position based on the second location of the 3D object within the second segment; and display the second segment comprising the 3D object using the plurality of microdisplays, wherein the first microdisplay is at the third position as the second segment is displayed.

17. The apparatus of claim 16, wherein the apparatus changes the first microdisplay from the second position to the third position using one or more telescopic support rods attached to the first microdisplay.

18. The apparatus of claim 11, wherein the apparatus is further caused to identify the first location of the 3D object within the first segment.

19. The apparatus of claim 18, wherein the first location of the 3D object corresponds to a depth of a virtual plane in the first segment.

20. A non-transitory computer-readable medium having instructions encoded thereon that, when executed by control circuitry, cause the control circuitry to:
- receive a piece of three-dimensional (3D) content comprising a plurality of segments;
- determine that a first segment of the plurality of segments comprises a 3D object, wherein the 3D object corresponds to a first location within the first segment;
- change a first microdisplay of a plurality of microdisplays from a first position to a second position based on the first location of the 3D object within the first segment; and
- display the first segment comprising the 3D object using the plurality of microdisplays, wherein the first microdisplay is at the second position as the first segment is displayed.

* * * * *